(12) United States Patent
Kosako

(10) Patent No.: US 12,076,948 B2
(45) Date of Patent: *Sep. 3, 2024

(54) COMPOSITE MATERIAL STRUCTURE AND COMPOSITE MATERIAL STRUCTURE PRODUCING METHOD

(71) Applicant: Yazaki Corporation, Tokyo (JP)

(72) Inventor: Terukazu Kosako, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 644 days.

This patent is subject to a terminal disclaimer.

(21) Appl. No.: 17/352,510

(22) Filed: Jun. 21, 2021

(65) Prior Publication Data

US 2022/0001633 A1 Jan. 6, 2022

(30) Foreign Application Priority Data

Jul. 6, 2020 (JP) .................................. 2020-116363

(51) Int. Cl.
*B29C 70/88* (2006.01)
*C08J 5/04* (2006.01)
(Continued)

(52) U.S. Cl.
CPC ............. *B29C 70/882* (2013.01); *C08J 5/042* (2013.01); *H01B 1/24* (2013.01); *H01B 3/004* (2013.01); *H01B 3/47* (2013.01)

(58) Field of Classification Search
CPC ......... B32B 27/30; B32B 27/34; B32B 27/36; B32B 27/288; B32B 27/365; B32B 27/38;
(Continued)

(56) References Cited

U.S. PATENT DOCUMENTS 11,837,832 B2 * 12/2023 Kosako .................. B60R 16/02
2005/0218503 A1 10/2005 Abe et al.
(Continued)

FOREIGN PATENT DOCUMENTS

DE 103 08 663 A1 12/2003
JP 5-193047 A 8/1993
(Continued)

*Primary Examiner* — Tri V Nguyen
(74) *Attorney, Agent, or Firm* — Sughrue Mion, PLLC

(57) ABSTRACT

A composite material structure that prevents a decrease in strength while interposing insulating resin portions between a conductive reinforced resin and a conductor, is provided. The composite material structure includes a conductive resin portion formed of an electrically conductive reinforced resin in which conductive fibers are contained in an insulating base material, a conductor which is formed of an electrically conductive material and a part of which is embedded in the conductive resin portion, and a plurality of layers of insulating resin portions which is layers of resin portions each including insulating fibers contained in an insulating base material, the plurality of layers of the insulating resin portions being embedded in the conductive resin portion so as to sandwich therebetween the at least the part of the conductor and so as to be interposed between the conductive fibers and the conductor.

12 Claims, 12 Drawing Sheets

(51) Int. Cl.
*H01B 1/24* (2006.01)
*H01B 3/00* (2006.01)
*H01B 3/47* (2006.01)

(58) Field of Classification Search
CPC ........ B32B 2307/206; B32B 2262/103; B32B 2262/106; B32B 2307/202; B29C 70/72; B29C 70/882; H01B 1/004; H01B 1/24; H01B 3/47; H01B 1/04; C08J 5/042
USPC .......................................... 252/502, 510, 511
See application file for complete search history.

(56) References Cited

U.S. PATENT DOCUMENTS

| | | | |
|---|---|---|---|
| 2007/0186414 A1* | 8/2007 | Abe | ................... H05K 3/4641 174/262 |
| 2014/0097011 A1 | 4/2014 | Hofer | |
| 2015/0325340 A1 | 11/2015 | Specht et al. | |
| 2018/0079526 A1 | 3/2018 | Mciver et al. | |
| 2019/0009497 A1* | 1/2019 | Sasaki | ................... B32B 27/281 |

FOREIGN PATENT DOCUMENTS

| | | |
|---|---|---|
| JP | 11-123765 A | 5/1999 |
| JP | 2006-049550 A | 2/2006 |
| JP | 2018-089951 A | 6/2018 |

\* cited by examiner

COMPOSITE MATERIAL STRUCTURE AND COMPOSITE MATERIAL STRUCTURE PRODUCING METHOD

TECHNICAL FIELD

The present invention relates to a composite material structure in which a conductor is embedded in a conductive resin portion formed of a conductive fiber and an insulating resin, and a composite material structure producing method for obtaining such composite material structure.

BACKGROUND

In recent years, along with multi-materialization of vehicle bodies, reinforced resins which are reinforced with carbon fibers such as CFRP (Carbon Fiber Reinforced Plastics) and CFRTP (Carbon Fiber Reinforced Thermo Plastics) have begun to be used for frame structures (for example, refer to Patent Document 1). When using such a reinforced resin for a frame structure, there is a problem of securing a ground point, and one possible solution can be, for example, a composite material structure in which a conductor is embedded in a resin portion formed of a reinforced resin. Although not intended for securing a ground point, Patent Document 1 exemplary shows a composite material structure in which a conductor used for transmission of an electrical signal and the like is embedded in a resin portion formed of a reinforced resin. In the composite material structure shown in Patent Document 1, the reinforced resin portion itself embedded in the conductor is the conductive resin portion formed of an electrically conductive reinforced resin containing conductive fibers such as carbon fibers and the like. Thus, in the composite material structure mentioned above, an insulating resin portion for insulating the conductive reinforced resin and the conductor is provided so as to be interposed between them.

PRIOR ART DOCUMENT

Patent Document 1: JP 2018-089951 A

SUMMARY OF THE INVENTION

Problem to be Solved by the Invention

However, when the insulating resin portion is interposed between the conductive reinforced resin and the conductor as shown in Patent Document 1, a connection between the conductive reinforced resin and the insulating resin portion at a boundary face is locally weakened, possibly causing a decrease in strength of the composite material structure.

In view of the problem as described above, an object of the present invention is to provide a composite material structure capable of preventing a decrease in strength while interposing an insulating resin portion between a conductive reinforced resin and a conductor. Another object of the present invention is to provide a composite material structure producing method for obtaining said composite material structure.

Solution to the Problem

In order to achieve the above-described object, the present invention provides a composite material structure including a conductive resin portion formed of an electrically conductive reinforced resin in which conductive fibers are contained in an insulating base material, a conductor which is formed of an electrically conductive material and at least a part of which is embedded in the conductive resin portion, and a plurality of layers of insulating resin portions which is layers of resin portions each including insulating fibers contained in an insulating base material, the plurality of layers of the insulating resin portions being embedded in the conductive resin portion so as to sandwich therebetween the at least the part of the conductor and so as to be interposed between the conductive fibers and the conductor.

In order to achieve the above-described object, the present invention further provides, a composite material structure producing method including an insulating fiber placing step of placing insulating fibers so as to sandwich therebetween at least a part of a conductor formed of an electrically conductive material, and a resin portion forming step of forming, using the conductor sandwiched between the insulating fibers, a conductive resin portion and a plurality of layers of insulating resin portions, the conductive resin portion being formed of an electrically conductive reinforced resin in which conductive fibers are contained in an insulating base material, at least a part of the conductor being embedded in the conductive resin portion, the plurality of layers of insulating resin portions being layers of resin portions each including insulating fibers contained in an insulating base material, and the plurality of layers of the insulating resin portions being embedded in the conductive resin portion so as to sandwich therebetween the at least the part of the conductor and so as to be interposed between the conductive fibers and the conductor.

Advantageous Effect of the Invention

According to the composite material structure and the composite material structure producing method described above, by interposing the insulating resin portions between the conductor embedded in the conductive resin portion and the conductive fibers contained in the conductive reinforced resin forming the conductive resin portion, the conductor and the conductive reinforced resin are electrically insulated. Further, since the insulating resin portions are the resin portions in which the insulating fibers are contained in the insulating base materials, tangle of fibers is likely to occur between the conductive fibers contained in the conductive reinforced resin and the insulating fibers of the insulating resin portions, and this tangle of fibers increases the strength of mechanical coupling between the conductive reinforced resin and the insulating resin portions. That is, according to the composite material structure and the composite material structure producing method described above, a decrease in the strength can be prevented while interposing the insulating resin portions between the conductive reinforced resin and the conductor.

DETAILED DESCRIPTION OF THE EXEMPLARY EMBODIMENTS

One embodiment of a composite material structure and of a composite material structure producing method according to the present invention will be described. Firstly, a first embodiment of a composite material structure will be described with reference to FIG. 1 and FIG. 2.

Figure 1:
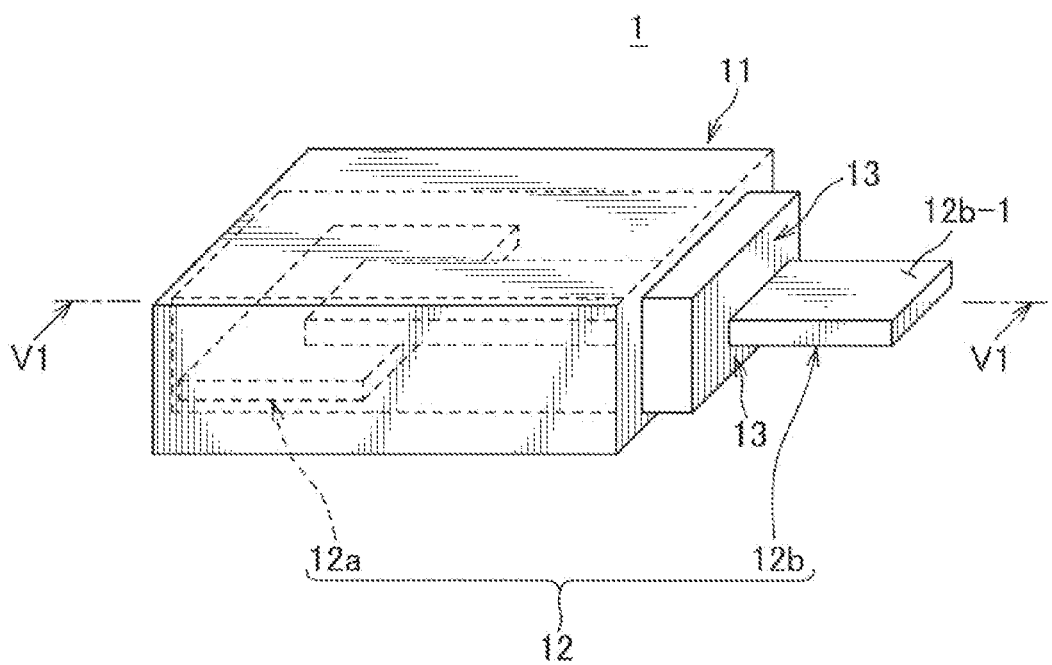
FIG. 1 is a schematic perspective view showing a composite material structure of a first embodiment.
Figure 2:
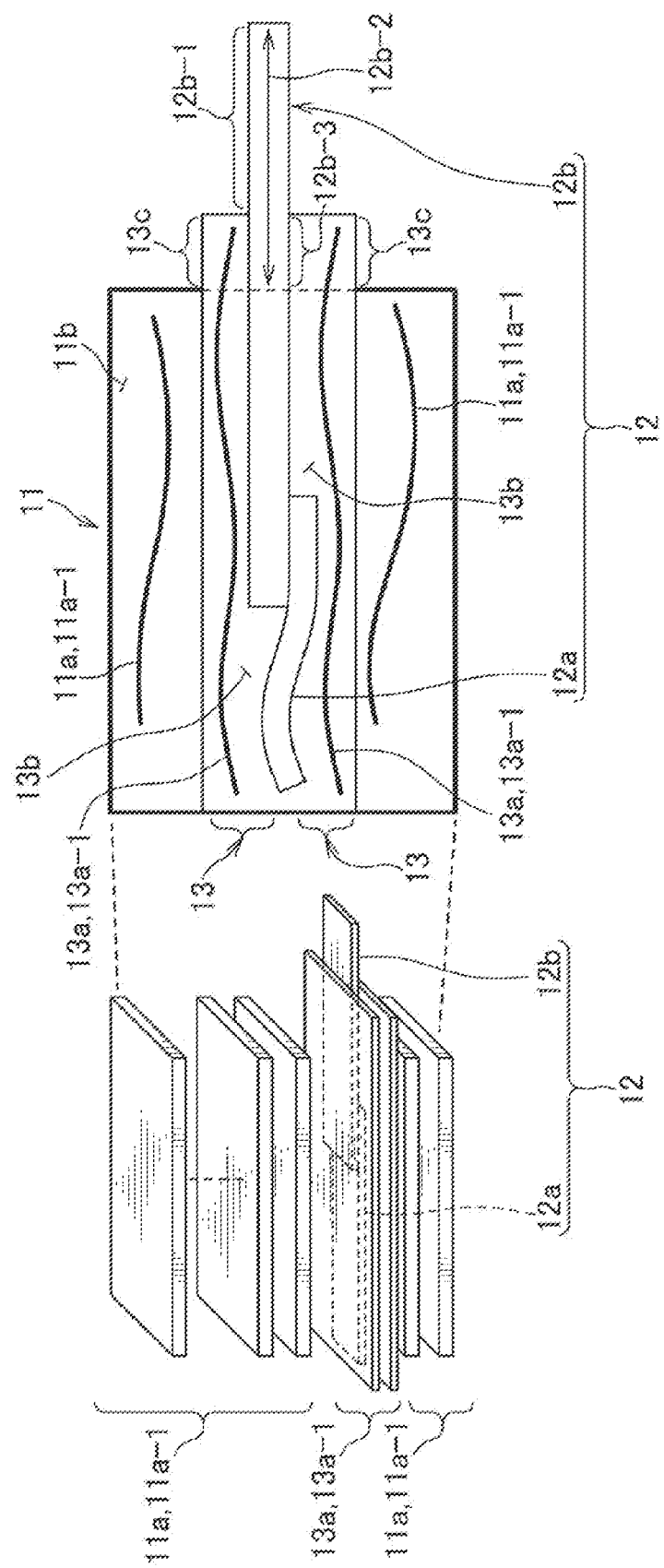
FIG. 2 is a schematic diagram showing an internal configuration of the composite material structure shown in FIG. 1.

FIG. 1 is a schematic perspective view showing a composite material structure of the first embodiment, and FIG. 2 is a schematic view showing an internal configuration of the composite material structure shown in FIG. 1. FIG. 2 shows a schematic exploded perspective view of a composite material structure 1 shown in FIG. 1 and a schematic cross-sectional view taken along the line V1-V1 in FIG. 1.

The composite material structure 1 of this embodiment is a structure in which a conductor 12 is embedded in a conductive resin portion 11, and a part of the conductor 12 is exposed as a connecting portion 12b-1 for electrical connection with another component. The composite material structure 1 includes the conductive resin portion 11, the conductor 12 and insulating resin portions 13.

As shown in FIG. 2, the conductive resin portion 11 is a portion formed of an electrically conductive reinforced resin in which conductive fibers 11a are contained in an insulating base material 11b. In this embodiment, although the conductive resin portion 11 is shown in a flat rectangular parallelepiped shape as one example, the shape thereof is not limited to this and may be any shape according to the actual applications thereof.

One example of the conductive fibers 11a is reinforcing fibers including electrical conductivity such as carbon fibers. Other examples of the reinforcing fibers include aluminum fibers, copper fibers, stainless steel fibers and the like.

The insulating base material 11b is an insulating resin, and examples thereof include thermosetting resins such as epoxy, phenol, unsaturated polyester, vinyl ester, cyanate ester, polyimide and the like. Examples of the insulating resin also include thermoplastic resins such as polyamide, polycarbonate, polyphenylene sulfide, polyetheretherketone and the like.

In this embodiment, as shown in FIG. 2, to incorporate the conductive fibers 11a into the insulating base material 11b, a stack of the conductive fiber sheets 11a-1 formed of the conductive fibers 11a is impregnated with the molten insulating base material 11b. However, the method of incorporating the conductive fibers 11a into the insulating base material 11b is not limited to this, and for example, fiber pieces obtained by shredding the conductive fibers 11a may be kneaded into the molten insulating base material 11b.

The conductor 12 is a portion formed of an electrically conductive material and embedded in the conductive resin portion 11 with a part of the conductor 12 exposed as a connecting portion 12b-1 for electrical connection with another component. In this embodiment, the conductor 12 includes a first conductor 12a which is entirely embedded in the conductive resin portion 11, and a second conductor 12b which is joined to the first conductor 12a inside the conductive resin portion 11 and a part of which is the connecting portion 12b-1. The second conductor 12b is an electrode to which another component such as an electric wire is connected, as will be described later.

In this embodiment, the first conductor 12a and the second conductor 12b of the conductor 12 are shown in a rectangular flat plate shape as one example. However, the shape thereof is not limited to the rectangular flat plate shape, and the first and second conductors may each be in any shape. In this embodiment, the first conductor 12a to be embedded in the conductive resin portion 11 is illustrated as a rectangular flat plate along the shape of the conductive resin portion 11, as shown in the perspective view of FIG. 1 and the exploded perspective view of FIG. 2. On the other hand, the cross-sectional view of FIG. 2 shows the first conductor 12a in the corrugated form to show that the first conductor 12a can be in any shape inside the conductive resin portion 11 also, regardless of the shape of the conductive resin portion 11. Further, the second conductor 12b a part of which is the connecting portion 12b-1 for connection with another component, may be in any shape that allows connection with another component such as an electric wire.

Examples of the material of the first conductor 12a include carbon fibers and the following metal materials which are generally used as materials for conductive components. That is, examples of the metal material include aluminum, copper, gold, other metals and alloys thereof, and the like. The shape of the first conductor 12a may be any shape as described above and may be, for example, a plate shape, a foil shape, a shaped of a sheet woven with metal fibers, a shape of a mesh formed roughly with metal wires, a linear shape, a rod shape, a tubular shape and such.

Examples of the material of the second conductor 12b used as the electrode include metal materials such as aluminum, copper, gold, other metals and alloys thereof and the like. In this embodiment, the second conductor 12b is shown in a rectangular flat plate shape as shown in FIG. 1 and FIG. 2. However, the shape of the second conductor is not limited to this as described above and may be another shape such as a shape of a round terminal and the like, as long as it allows connection with another component such as an electric wire.

In this embodiment, the first conductor 12a and the second conductor 12b as described above are joined inside the conductive resin portion 11 with ends thereof in surface contact with each other to form the conductor 12. A method of joining them may include general joining methods such as melt joining, solid phase joining, brazing, bonding and mechanical joining such as crimping, riveting, bolting and the like.

As shown in FIG. 2, the insulating resin portions 13 are layered resin portions each including the insulating base material 13b containing insulating fibers 13a. In this embodiment, two layers of the insulating resin portions 13 are embedded in the conductive resin portion 11 so as to sandwich a part of the conductor 12 and so as to be interposed between the conductive fibers 11a and the conductor 12. Further, in this embodiment, the insulating resin portions 13 are exemplary shown in a rectangular parallelepiped shape formed of two layers combined together. However, the shape of the insulating resin portions 13 is not limited to this and may be any shape as long as it is in layered form capable of being interposed between the conductive reinforced resin forming the conductive resin portion 11 and the conductor 12.

Examples of the insulating fibers 13a include fibers including an insulating property such as glass fibers and the like. Other examples of the insulating fibers 13a include boron fibers, silicon carbide fibers, boron carbide fibers, phenol resin fibers, aramid fibers and the like. Further examples of the insulating fibers 13a include polyarylate fibers, PBO (polyparaphenylene-benzobis-oxazole) fibers, high-strength polyethylene fibers and the like.

The thermosetting resins and the thermoplastic resins that are exemplary mentioned above for the insulating base material 11b of the conductive resin portion 11 can be used as the insulating base material 13b of the insulating resin portion 13. In this embodiment, for the insulating base material 13b of the insulating resin portion 13, the same resin as the insulating base material 11b of the conductive resin portion 11 is used. However, for the insulating base material 13b of the insulating resin portion 13, resin different from that for the insulating base material 11b of the conductive resin portion 11 may be used.

In this embodiment, as shown in FIG. 2, to incorporate the insulating fibers 13a into the insulating base material 13b, a stack of the insulating fiber sheets 13a-1 formed of the insulating fibers 13a is impregnated with the molten insulating base material 13b. However, the method of incorporating the insulating fibers 13a into the insulating base material 13b is not limited to this, and for example, fiber pieces obtained by shredding the insulating fibers 13a may be kneaded into the molten insulating base material 13b.

In this embodiment, the conductive resin portion 11, the conductor 12 and the insulating resin portions 13 described above are combined in the manner as described below to form the composite material structure 1. Firstly, the conductor 12b includes a conductor extended portion 12b-2 which extends to the outside of the conductive resin portion 11 and a part of which on its distal end side is exposed as the connecting portion 12b-1 for electrical connection with another component. The conductor extended portion 12b-2 protrudes and is exposed from one end surface of the rectangular parallelepiped shaped conductive resin portion 11, and the distal end side thereof is exposed to provide the connecting portion 12b-1. The insulating resin portions 13 are arranged so as to be also interposed between the conductive fibers 11a and the conductor extended portion 12b-2 so as to prevent the exposed connecting portion 12b-1 of the conductor extended portion 12b-2 from contacting the conductive fibers 11a. That is, the two layers of the insulating resin portions 13 include insulating extended portions 13c, respectively, that extend from the one end surface of the conductive resin portion 11 together with the conductor extended portion 12b-2 so as to sandwich a non-exposed portion 12b-3 located at a basal side of the conductor extended portion 12b-2 excluding the connecting portion 12b-1 between the insulating resin portions 13.

In an alternative embodiment, the insulating resin portions 13 may be configured not to protrude from the one end surface of the conductive resin portion 11 but to include exposed surfaces that are flush with this one end surface. In this case, the connecting portion 12b-1 of the conductor 12 protrudes from the exposed surfaces of the insulating resin portions 13 that are flush with the one end surface of the conductive resin portion 11.

Next, a composite material structure according to a second embodiment will be described with reference to FIG. 3.

Figure 3:
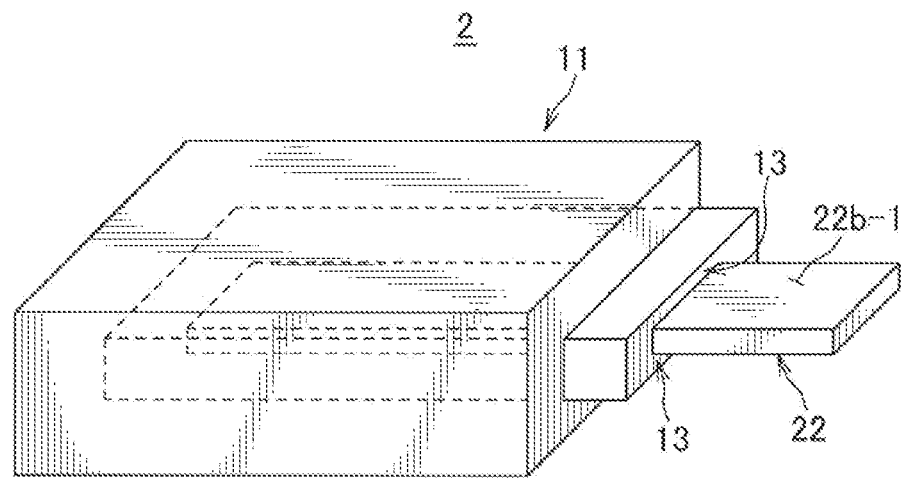
FIG. 3 is a schematic perspective view showing a composite material structure of a second embodiment.

FIG. 3 is a schematic perspective view showing the composite material structure of the second embodiment. In FIG. 3, the components equivalent to those in the first embodiment shown in FIG. 1 and FIG. 2 are shown with the same reference signs as those in FIG. 1 and FIG. 2, and in the following, duplicate explanations about these equivalent components are omitted.

In a composite material structure 2 of this embodiment, a conductor 22 is a single component, unlike the conductor 12 of the first embodiment described above which is constituted of two components joined together. In this embodiment, the conductor 22 which is a rectangular flat plate embedded widely inside the conductive resin portion 11 extends to the outside of the conductive resin portion 11 as it is, and is exposed to provide a connecting portion 22b-1 with a part of the conductor 22 protruding from between the two layers of the insulating resin portions 13. In this embodiment, the conductor 22 has a thickness and strength sufficient to be used as an electrode including the connecting portion 22b-1 for connection with another component, and thus, a part of the conductor 22 is used as an electrode, as it is, eliminating the need for providing a separate electrode as in the first embodiment.

Next, two connection examples of connecting another component to the connecting portion 12b-1, 22b-1 of the conductor 12, 22 of the first and second embodiments described above will be described. These connection examples are common between the first and second embodiments, thus the following explanation is given with reference to the composite material structure 1 of the first embodiment as a representative example.

Figure 4:
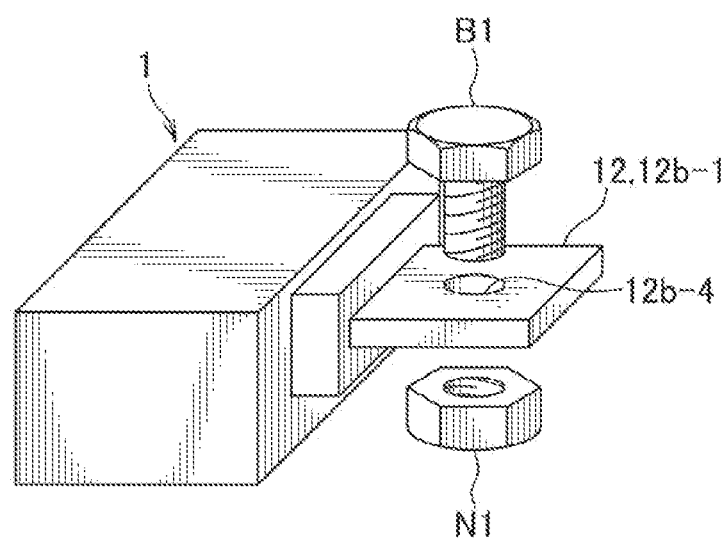
FIG. 4 is a schematic perspective view showing a first connection example with respect to a connecting portion of a conductor of the first embodiment.

FIG. 4 is a schematic perspective view showing a first connection example with respect to the connecting portion of the conductor of the first embodiment.

In the first connection example, a through hole 12b-4 for connection is provided at the connecting portion 12b-1 of the conductor 12 of the composite material structure 1. Another component is to be fastened and connected to the connecting portion 12b-1 by a bolt B1 inserted through the through hole 12b-4 and a nut N1 screwed to the bolt B1. Examples of the another component in this example include a bus bar formed of a metal plate, an electric wire including, at its end, a connecting component such as a round terminal that can be fastened using the bolt B1 and the nut N1, and the like.

As a modified example of this first connection example, a screw hole in which the bolt B1 can be screwed may be provided instead of the through hole 12b-4, or the nut N1 may be welded and fixed to the connecting portion 12b-1. Further, as another example, the bolt B1 may be welded and fixed to the connecting portion 12b-1 with the screw portion passed through the through hole 12b-4 protruding therefrom.

Figure 5:
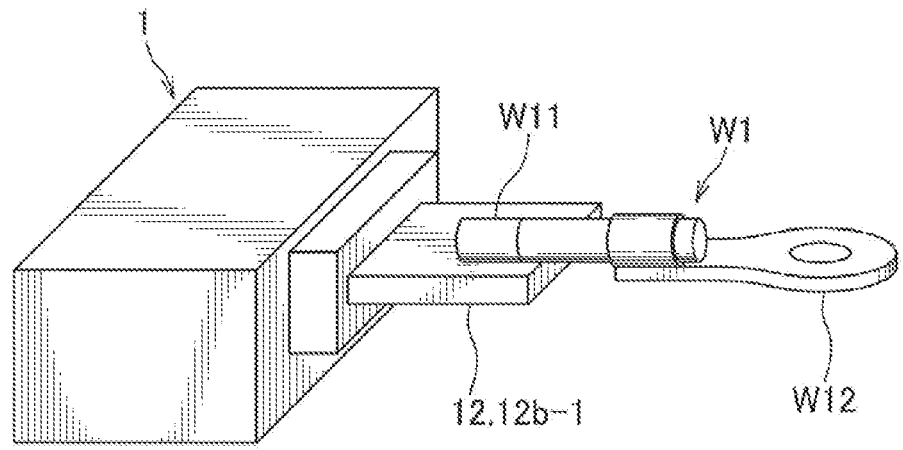
FIG. 5 is a schematic perspective view showing a second connection example with respect to a connecting portion of a conductor of the first embodiment.

FIG. 5 is a schematic perspective view showing a second connection example with respect to the connecting portion of the conductor of the first embodiment.

In the second connection example, an exposed core wire W11 on one end side of an electric wire with terminal W1 as another component is soldered and fixed to the connecting portion 12b-1 of the conductor 12 of the composite material structure 1. A round terminal W12 for connection with an electric/electronic device is crimped to the other end side of the electric wire with terminal W1.

As a modified example of this second connection example, instead of the electric wire with terminal W1, one end of a connector terminal of a connector may be soldered and fixed, for example. Further, as an example of the connecting method for connection with respect to the connecting portion 12b-1, ultrasonic welding, crimping, or the like may be used instead of soldering.

According to the composite material structures 1, 2 of the first and second embodiments described above, the following advantageous effect can be obtained. That is, according to the composite material structures 1, 2 described above, the insulating resin portions 13 are interposed between the conductive fibers 11a contained in the conductive reinforced resin forming the conductive resin portion 11, and the conductor 12, 22 embedded in the conductive resin portion 11. With the insulating resin portions 13 interposed in this manner, the conductive reinforced resin and the conductor 12, 22 are electrically insulated. In addition, since the insulating resin portions 13 are resin portions in which the insulating fibers 13a are contained in the insulating base materials 13b, tangle of fibers is likely to occur between the conductive fibers 11a contained in the conductive reinforced resin and the insulating fibers 13a of the insulating resin portions 13. This tangle of the fibers increases the strength of mechanical coupling between the conductive reinforced resin and the insulating resin portions 13. That is, according to the composite material structures 1, 2 described above, a decrease in the strength can be prevented while interposing the insulating resin portions 13 between the conductive reinforced resin and the conductor 12, 22.

In the first and second embodiments, the conductive resin portion 11 is configured such that the plurality of conductive fiber sheets 11a-1 in the stacked state is contained in the insulating base material 11b. Further, the conductor 12, 22 is configured such that a part thereof is embedded in the conductive resin portion 11 so as to be sandwiched between the conductive fiber sheets 11a-1 from outside of the insulating resin portions 13. According to this configuration, the conductive resin portion 11 can be obtained by arranging the plurality of conductive fiber sheets 11a-1 in a stack while sandwiching the conductor 12, 22 and the insulating resin portions 13 between the conductive fiber sheets 11a-1 and then impregnating the stack with the insulating base material 11b, which is a method that can provide good workability, and thus this configuration is preferable.

Further, in the first and second embodiments, the insulating resin portions 13 are configured such that the insulating fiber sheets 13a-1 formed of the insulating fibers 13a are contained in the insulating base materials 13b so as to be interposed between the conductive fibers 11a and the conductor 12, 22. Herein, there is no particular limitation on the magnitude relationship between the insulating fiber sheet 13a-1 and the conductive fiber sheet 11a-1 formed of the conductive fibers 11a, and the insulating fiber sheet 13a-1 and the conductive fiber sheet 11a-1 may be in any arrangement and dimensional relationships as long as electrical insulation is securely provided between the conductor 12, 22 and the conductive fiber sheet 11a-1. It is desirable, however, to make the insulating fiber sheet 13a-1 to have a minimum size that covers the circumference of the conductor 12, 22. According to this configuration, the insulating resin portions 13 can be obtained by arranging the plurality of insulating fiber sheets 13a-1 in a stack while sandwiching the conductor 12, 22 therebetween and then impregnating the stack with the insulating base material 13b, which is a method that can provide good workability, thus this configuration is preferable.

The first and second embodiments show examples in which the two layers of the insulating resin portions 13 are provided so as to sandwich one conductor 12, 22. However, the number of layers of the insulating resin portions 13 is not limited to two, and the insulating resin portions may be provided in more than two layers. In this case, the conductor 12, 22 may be arranged one by one at the respective inter-layer portions between the layers of the insulating resin portions 13, or, the conductor 12, 22 may be arranged one by one at one inter-layer portion or at more than one inter-layer portions.

Further, in the first and second embodiments, the conductor 12, 22 includes the conductor extended portion 12b-2 which extends to the outside of the conductive resin portion 11 and at least a part of which is exposed as the connecting portion 12b-1, 22b-1. The insulating resin portions 13 are provided so as to be also interposed between the conductive fibers 11a and the conductor extended portion 12b-2. According to this configuration, the conductor 12, 22 inside the composite material structure 1, 2 can be connected to another external component via the exposed connecting portion 12b-1, 22b-1. If the exposed connecting portion 12b-1, 22b-1 is in contact with the conductive fibers 11a of the conductive reinforced resin and water or the like gets onto this contacting portion, then so-called galvanic corrosion may occur at this portion. According to the above configuration, however, the contact between the exposed connecting portion 12b-1, 22b-1 and the conductive fibers 11a can be prevented by the insulating resin portions 13, thereby preventing galvanic corrosion.

In the first and second embodiments, the insulating resin portions 13 include insulating extended portions 13c that sandwich therebetween least a part of a non-exposed portion 12b-3 located at a basal side of the conductor extended portion 12b-2. According to this configuration, the basal side of the protruded and exposed connecting portion 12b-1, 22b-1 is further separated from the conductive fibers 11a of the conductive resin portion 11 by the insulating extended portions 13c of the insulating resin portions 13. By this separation, the reliability of the prevention of the contact between the basal side of the connecting portion 12b-1, 22b-1 and the conductive fibers 11a can be improved, thereby further preventing galvanic corrosion.

Further, in the first and second embodiments, the conductor 12, 22 includes the first conductor 12a that is entirely embedded in the conductive resin portion 11, and the second conductor 12b that is joined to the first conductor 12a. The insulating resin portions 13 are embedded so as to sandwich therebetween the first conductor 12a and the embedded portion of the second conductor 12b. According to these configurations, the conductor 12, 22 is divided into the first conductor 12a and the second conductor 12b, the first conductor 12a being entirely embedded in the conductive resin portion 11 to be used as a chassis ground and such, and the second conductor 12b being jointed to this first conductor 12a. Since the conductor is divided in this manner, the respective parts of the conductor 12, 22 can be formed of conductive materials suitable for the purpose of use.

Next, a composite material structure according to a third embodiment will be described with reference to FIG. 6.

Figure 6:
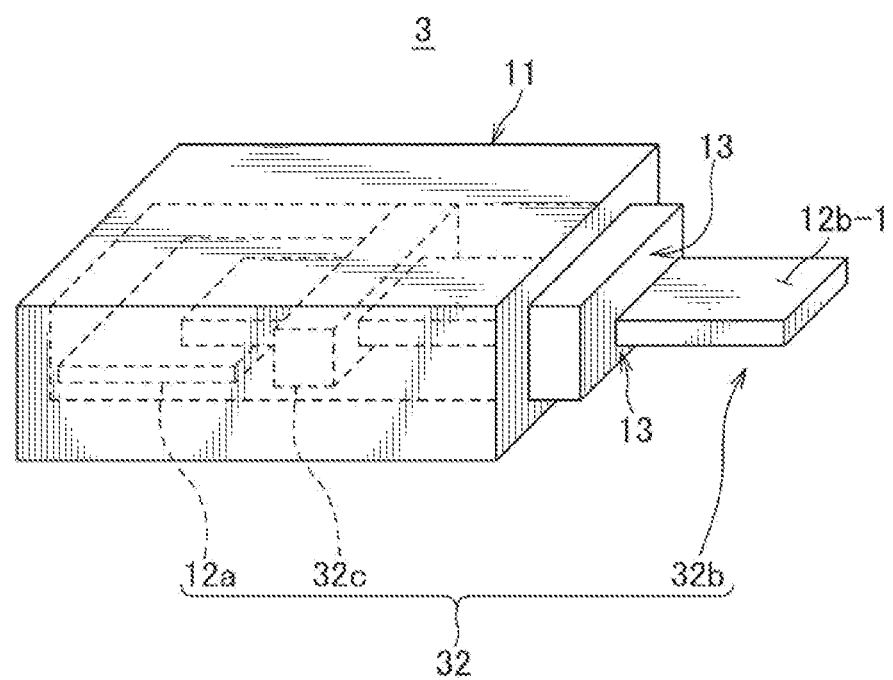
FIG. 6 is a schematic cross-sectional view showing a composite material structure of a third embodiment.

FIG. 6 is a schematic perspective view showing the composite material structure of the third embodiment. In FIG. 6 also, the components equivalent to those in the first embodiment shown in FIG. 1 and FIG. 2 are shown with the same reference signs as those in FIG. 1 and FIG. 2, and in the following, duplicate explanations about these equivalent components are omitted.

In the composite material structure 3 of this embodiment, a second conductor 32b of a conductor 32 which is joined to the first conductor 12a and a pat of which is exposed as the connecting portion 12b-1, is provided with a protrusion 32c arranged to be in close contact with the insulating resin portions 13 inside the conductive resin portion 11. The protrusion 32c is arranged in the shape of a rectangular parallelepiped and arranged across the middle of the strip-shaped second conductor 32b, and one side surface of the protrusion 32c along its longitudinal direction is in close contact with the insulating resin portion 13.

In the composite material structure 3 of the third embodiment described above also, a decrease in the strength can be prevented while interposing the insulating resin portions 13 between the conductive reinforced resin and the conductor 32, as in the first embodiment described above.

Further, according to this embodiment, the conductor 32 is provided with the protrusion 32c arranged to be in close contact with the insulating resin portion 13 inside the conductive resin portion 11, thereby strengthening the contact between the conductor 32 and the insulating resin portion 13. In addition, since the protrusion 32c serves as a stopper against an external force applied to the connecting portion 12b-1 in the direction of pulling the conductor 32 from the insulating resin portions 13, the strength of the composite material structure 3 against such external force can be improved.

As a modified example of the third embodiment, the shape of the protrusion 32c of the conductor 32 may be changed from a rectangular parallelepiped to a shape other than a rectangular parallelepiped such as a polygonal cylinder, a circular cylinder and the like. In another modified example, as a configuration that strengthens the contact between the conductor 32 and the insulating resin portion 13 and that serves as a stopper, the portion of the conductor 32 embedded in the insulating resin portion 13 may have a concavo-convex shape in which protrusions and indents with respect to a direction intersecting the direction of the above-described external force are arranged alternately along the direction of the external force. In another example, the portion of the conductor 32 embedded in the insulating resin portions 13 may be provided with a through hole, and the inside of the through hole may be filled with the insulating base material 13b that forms the insulating resin portion 13.

Next, a composite material structure according to a fourth embodiment will be described with reference to FIG. 7.

Figure 7:
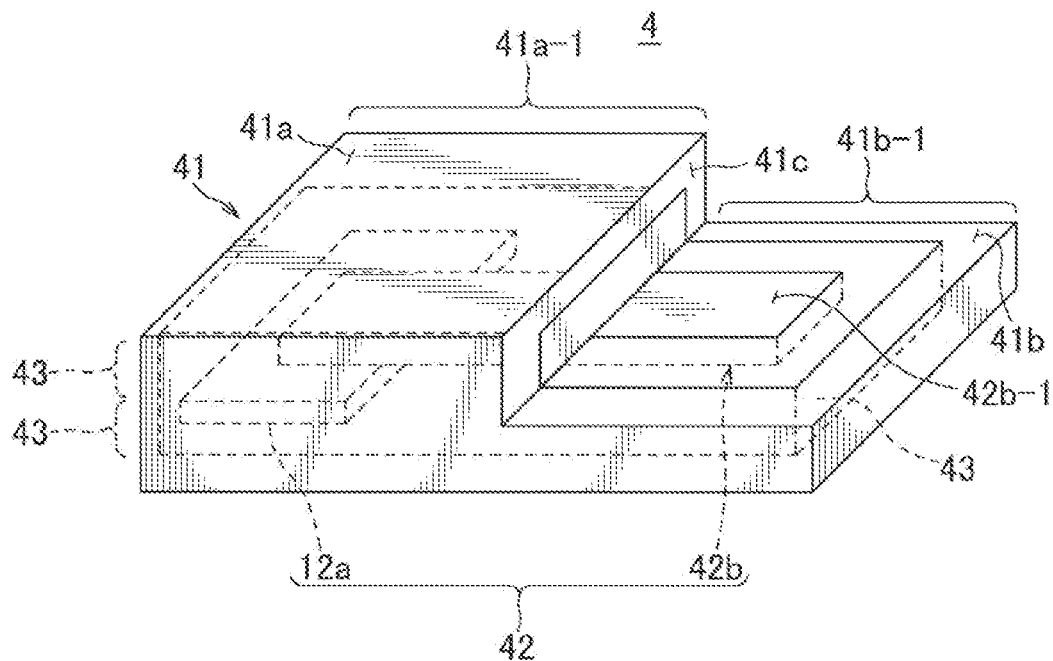
FIG. 7 is a schematic perspective view showing a composite material structure of a fourth embodiment.

FIG. 7 is a schematic perspective view showing the composite material structure of the fourth embodiment. In FIG. 7 also, the components equivalent to the components in the first embodiment shown in FIG. 1 and FIG. 2 are shown with the same reference signs as those in FIG. 1 and FIG. 2, and in the following, duplicate explanations about these equivalent components are omitted.

In the composite material structure 4 of this embodiment, a conductive resin portion 41 includes a step-shaped portion including a first plane 41a, a second plane 41b arranged one step lower from the first plane 41a, and a standing plane 41c connecting the first and second planes.

In this embodiment, a conductor 42 is embedded in the conductive resin portion 41 with a part of a second conductor 42b exposed, as a connecting portion 42b-1, at a second portion 41b-1 of the conductive resin portion 41 that includes the second plane 41b, and with a rest of the second conductor 42b embedded in the second portion 41b-1. Insulating resin portions 43 are provided so as to sandwich therebetween the conductor 42 including the first conductor 12a at a first portion 41a-1 of the conductive resin portion 41 that includes the first plane 41a. On the other hand, at the second portion 41b-1, the insulating resin portion 43 is embedded in the conductive resin portion 41 on the side opposite to the exposed side of the connecting portion 42b-1 of the second conductor 42b.

Further, the insulating resin portion 43 is formed so that the part thereof is exposed flush with the second plane 41b of the conductive resin portion 41. Further, the second conductor 42b constituting the conductor 42 includes the connecting portion 42b-1 which is the part further exposed in the manner flush with the surface of the part of the insulating resin portion 43 exposed from the second plane 41b of the conductive resin portion 41. That is, in this embodiment, the second plane 41b of the conductive resin portion 41, the exposed surface of the insulating resin portion 43 exposed from the second plane 41b, and the surface of the connecting portion 42b-1 are flush with each other.

Next, two connection examples of connecting another component to the connecting portion 42b-1 of the conductor 42 of the fourth embodiment described above will be explained.

Figure 8:
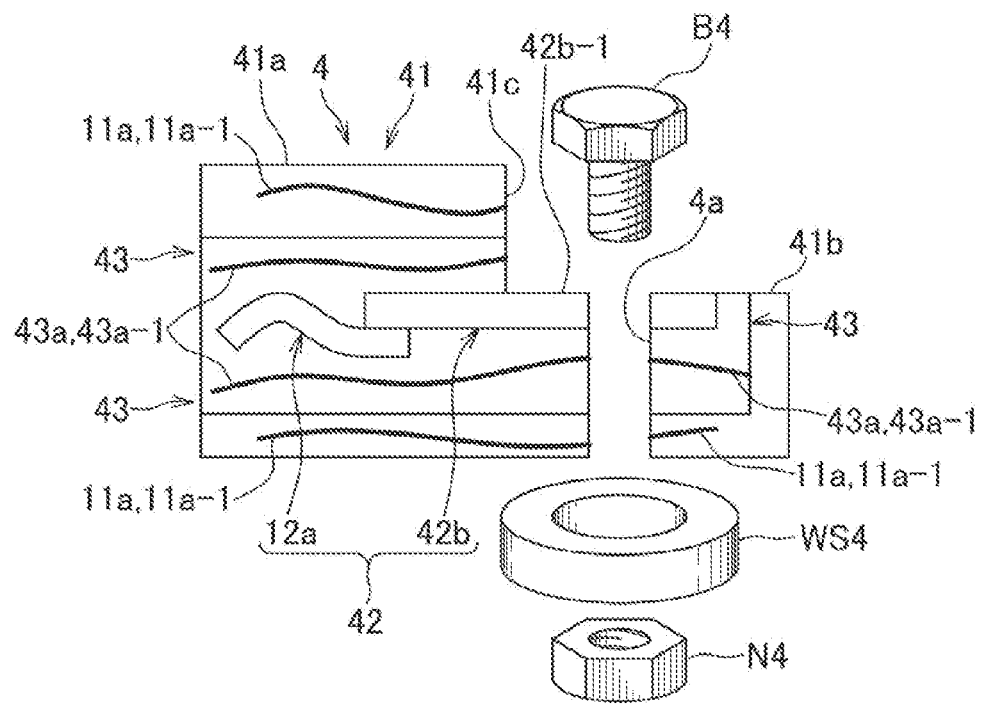
FIG. 8 is a schematic cross-sectional view showing a first connection example with respect to a connecting portion of a conductor of the fourth embodiment.

FIG. 8 is a schematic cross-sectional view illustrating a first connection example with respect to the connecting portion of the conductor of the fourth embodiment.

In the first connection example, a part of the composite material structure 4 that includes the connecting portion 42b-1 of the second conductor 42b constituting the conductor 42 together with the first conductor 12a, is provided with a through hole 4a for connection. This through hole 4a is provided to penetrate through the connecting portion 42b-1, the insulating resin portion 43 located beneath and including an insulating fiber sheet 43a-1 formed of insulating fibers 43a, and the conductive resin portion 41 located further beneath and including the conductive fiber sheet 11a-1. Another component is fastened and connected to the connecting portion 42b-1 by a bolt B4 penetrating the through hole 4a, a nut N4 screwed to the bolt B4, and an insulating washer WS4 interposed between the nut N4 and the conductive resin portion 11. Examples of the another component in this example include a bus bar formed of a metal plate, an electric wire including, at its end, a connecting component such as a round terminal that can be fastened using the bolt B4, the nut N4 and the insulating washer WS4, and the like.

Further, as a modified example of the first connection example, for example, a screw hole in which the bolt B4 can be screwed can be provided in place of the through hole 4a, or a connector terminal including a terminal shape that enables attachment and detachment of the another component to the connecting portion 42b-1 can be provided as an electrode.

Figure 9:
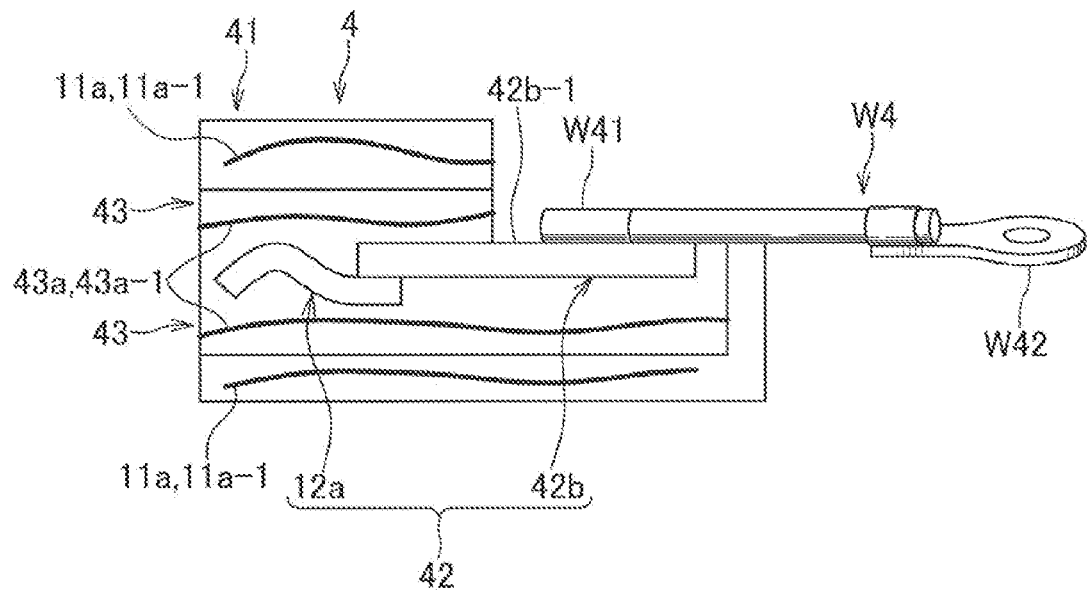
FIG. 9 is a schematic cross-sectional view showing a second connection example with respect to a connecting portion of a conductor of the fourth embodiment.

FIG. 9 is a schematic cross-sectional view illustrating a second connection example with respect to the connecting portion of the conductor of the fourth embodiment.

In the second connection example, an exposed core wire W41 on one end side of an electric wire with terminal W4 as another component is soldered and fixed to the connecting portion 42b-1 of the second conductor 42b of the composite material structure 4 that together with the first conductor 12a constitutes the conductor 42. A round terminal W42 for connection with an electric/electronic device is crimped to the other end side of the electric wire with terminal W4.

As a modified example of the second connection example, instead of the electric wire with terminal W4, one end of a connector terminal of a connector may be soldered and fixed, for example. In another example, as the connecting method for connection with respect to the connecting portion 42b-1, ultrasonic welding, crimping or the like can be used in place of soldering.

In the composite material structure 4 of the fourth embodiment described above also, a decrease in the strength can be prevented while interposing the insulating resin portion 43 between the conductive reinforced resin and the conductor 42, as in the first embodiment and such described above.

In addition, in this embodiment, the connecting portion 42b-1 is exposed at the second portion 41b-1 including the second plane 41b of the step shape of the conductive resin portion 41 that is one-step lower, which is an easy-to-access part. And, at this part, the insulating resin portion 43 is interposed between the connecting portion 42b-1 and the conductive fibers 11a on the side opposite to the exposed side of the conductor 42 to insulate them. With the connecting portion 42b-1 provided at the second portion 41b-1 while securing the insulation with respect to the conductive fibers 11a by the insulating resin portion 43, attachment of an electric wire and the like to the connecting portion 42b-1, for example, can be performed with good workability.

Further, in this embodiment, the insulating resin portion 43 is formed such that a part thereof is exposed flush with the surface such as the second plane 41b and the standing plane 41c of the conductive resin portion 41. Further, the conductor 42 includes the connecting portion 42b-1 that is the part exposed from the part of the insulating resin portion 43 exposed from the second plane 41b. According to this configuration, since the insulating resin portion 43 does not protrude from and is flush with the surface of the conductive resin portion 41, it is possible to reduce the size of the composite material structure 4 for that amount.

Further, in this embodiment, the conductor 42 includes the connecting portion 42b-1 that is the part exposed in a manner flush with the surface of the part of the insulating resin portion 43 exposed from the second plane 41b of the conductive resin portion 41. According to this configuration, since the connecting portion 42b-1 does not protrude from and is flush with the surface of the insulating resin portion 43, it is possible to reduce the size of the composite material structure 4 for that amount. Further, since the insulating resin portion 43 including the surface flush with the connecting portion 42b-1 can support the entire connecting portion 42b-1, it is possible to improve the mechanical strength of the connecting portion 42b-1 against an external force. It is further possible to reduce the thickness of the connecting portion 42b-1 of the conductor 42 in view of the improvement in the mechanical strength thereof, and it is further possible to use a conductive material that is excellent in electrical property but somewhat inferior in mechanical strength as a material for forming the connecting portion 42b-1 of the conductor 42.

Next, a composite material structure according to a fifth embodiment will be described with reference to FIG. 10 and FIG. 11.

Figure 10:
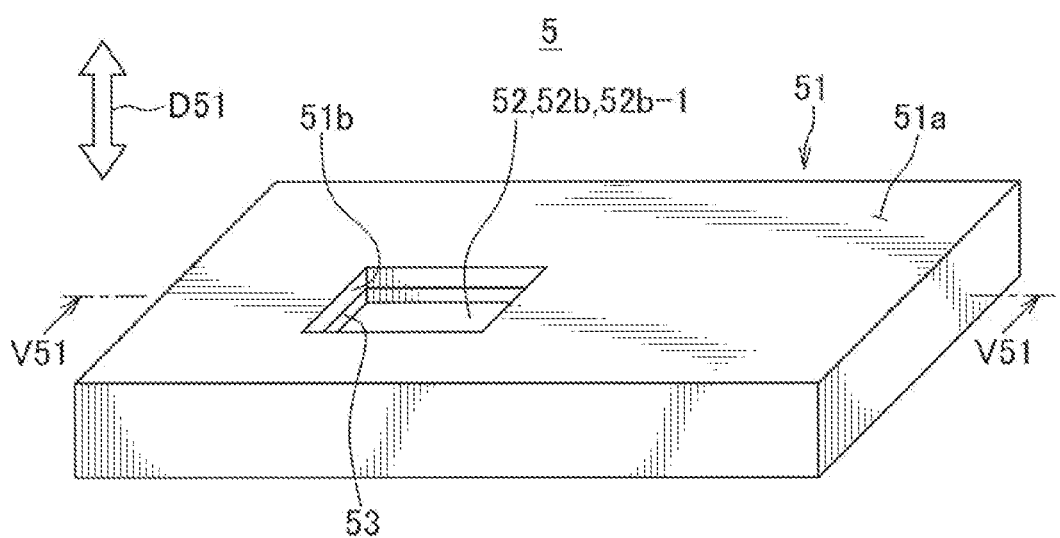
FIG. 10 is a schematic perspective view showing a composite material structure of a fifth embodiment.
Figure 11:
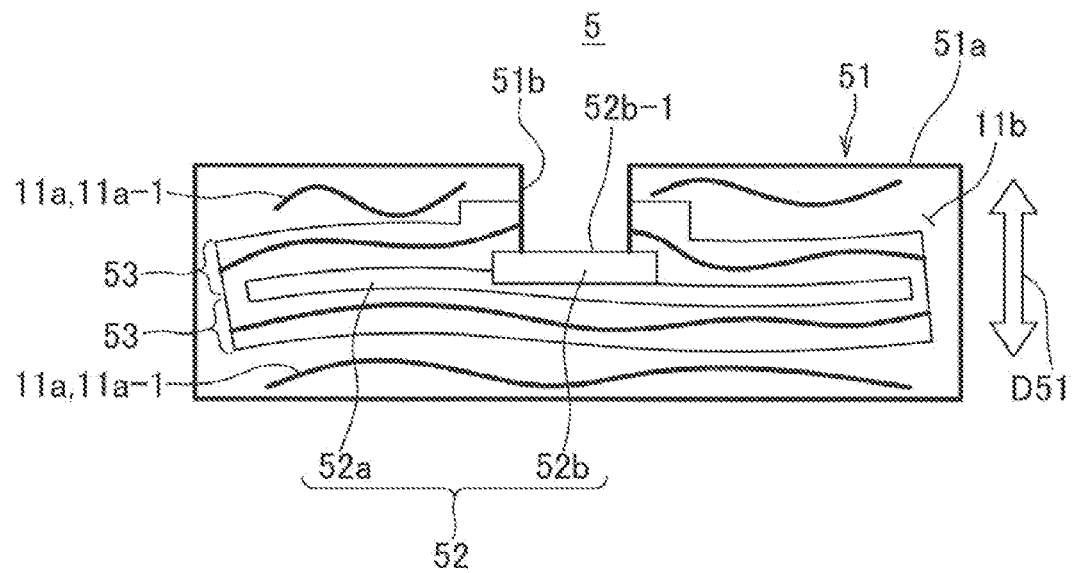
FIG. 11 is a schematic cross-sectional view taken along the line V51-V51 in FIG. 10, showing an internal configuration of the composite material structure shown in FIG. 10.

FIG. 10 is a schematic perspective view showing a composite material structure of the fifth embodiment, and FIG. 11 is a schematic cross-sectional view taken along line V51-V51 in FIG. 10, showing the internal configuration of the composite material structure shown in FIG. 10. In FIG. 10 and FIG. 11 also, the components equivalent to those in the first embodiment shown in FIG. 1 and FIG. 2 are shown with the same reference signs as in FIG. 1 and FIG. 2, and in the following, duplicate explanations about these equivalent components are omitted.

In a composite material structure 5 of this embodiment, a quadrangular cylinder-shaped recess 51b is provided at a wide surface 51a of a conductive resin portion 51 formed in a flat rectangular parallelepiped. Similar to the first embodiment described above, the conductive resin portion 51 is formed of the conductive reinforced resin in which the stack of the conductive fiber sheets 11a-1 formed of the conductive fibers 11a is impregnated with the molten insulating base material 11b. The recess 51b is formed through a part of the conductive fiber sheet 11a-1. The shape of the recess 51b is not limited to a quadrangular cylinder-like shape, and it may be a polygonal cylinder-like shape other than a quadrangular cylinder-like shape, or it may be a circular cylinder-like shape, as long as it is a cylinder-like shape.

The conductor 52 of the composite material structure 5 includes a first conductor 52a and a second conductor 52b. The first conductor 52a is entirely embedded in the conductive resin portion 51 so as to be sandwiched between the conductive fiber sheets 11a-1 of the stack of the conductive fiber sheets 11a-1. The second conductor 52b is formed in a quadrangular plate shape, and is placed near a center of the first conductor 52a and joined thereto, with a part of the second conductor 52b exposed as a connecting portion 52b-1 at a bottom of the recess 51b in the conductive resin portion 51. Thus, the conductor 52 is embedded in the conductive resin portion 51 such that a part of the second conductor 52b is exposed as the connecting portion 52b-1 so as to form the bottom of the recess 51b. The shape of the second conductor 52b of the conductor 52 is not limited to a quadrangular plate shape. The shape of the second conductor 52b may be another shape such as a circular plate shape, as long as a part of the second conductor 52b can constitute the bottom of the recess 51b in the conductive resin portion 51. Alternatively, the conductor 52 may be constituted of only the first conductor 52a without providing the second conductor 52b.

The insulating resin portions 53 of the composite material structure 5 are embedded in the conductive resin portion 51 so as to be interposed between the conductive reinforced resin and the second conductor 52b with a part of the insulating resin portion 53 exposed at the bottom side, in a depth direction D51 of the recess 51b, of an inner circumferential surface of the recess 51b. At a part of the conductive resin portion 51 other than the recess 51b, the insulating resin portions 53 are interposed between the conductive fibers 11a and the conductor 52 so as to sandwich the conductor 52 between the insulating resin portions 53. At a part where the recess 51b is provided, the insulating resin portion 53 is embedded in the conductive resin portion 51 so as to be interposed between the conductor 52 and the conductive fibers 11a on the side opposite to the exposed side of the conductor 52. At the inner circumferential surface of the recess 51b, the insulating resin portion 53 is interposed between the conductive reinforced resin and the second conductor 52b so as to cover an outer circumferential portion of the second conductor 52b over the entire circumference, thereby preventing the connecting portion 52b-1 of the second conductor 52b from contacting the conductive reinforced resin. Herein, the insulating resin portion 53 is not limited to be configured with a part thereof exposed at the bottom side of the inner circumferential surface of the recess 51b; it may be exposed at the entire circumferential surface of the inner circumferential surface of the recess 51b, i.e., the inner circumferential surface of the insulating resin portion 53 may constitute the recess 51b itself.

Next, two connection examples of connecting another component to the connecting portion 52b-1 of the conductor 52 of the fifth embodiment described above will be described.

Figure 12:
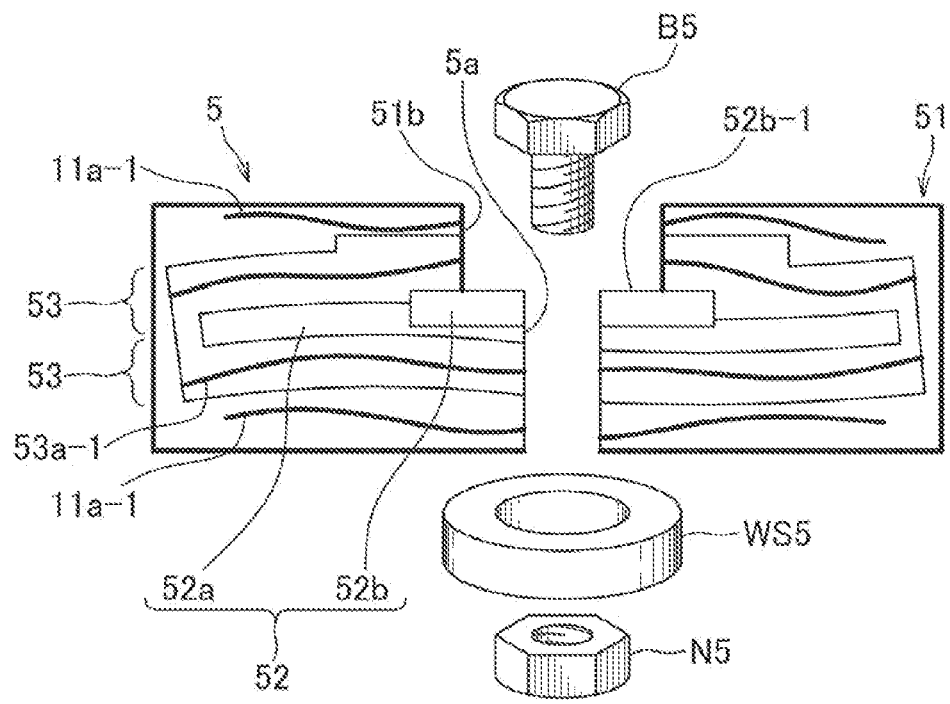
FIG. 12 is a schematic cross-sectional view showing a first connection example with respect to a connecting portion of a conductor of the fifth embodiment.

FIG. 12 is a schematic cross-sectional view illustrating a first connection example with respect to the connecting portion of the conductor of the fifth embodiment.

In the first connection example, a through hole 5a for connection is provided at a part of the composite material structure 5 where the connecting portion 52b-1 of the second conductor 52b constituting the conductor 52 is provided. This through hole 5a is provided to penetrate through the connecting portion 52b-1, the first conductor 52a located beneath, the insulating resin portion 53 located further beneath and including the insulating fiber sheet 53a-1, and the conductive resin portion 51 located further beneath and including the conductive fiber sheet 11a-1. Another component is to be fastened and connected to the connecting portion 52b-1 by a bolt B5 inserted through the through hole 5a, a nut N5 screwed to the bolt B5 and an insulating washer WS5 interposed between the nut N5 and the conductive resin portion 51. Examples of the another component in this example include a bus bar formed of a metal plate, an electric wire including, at its end, a connecting component such as a round terminal that can be fastened using the bolt B5 the nut N5 and the washer WS5, and the like.

As a modified example of the first connection example, a screw hole in which the bolt B5 can be screwed can be provided in place of the through hole 5a, or a connector terminal including a terminal shape that enables attachment and detachment of the another component to the connecting portion 52b-1 can be provided as an electrode.

Figure 13:
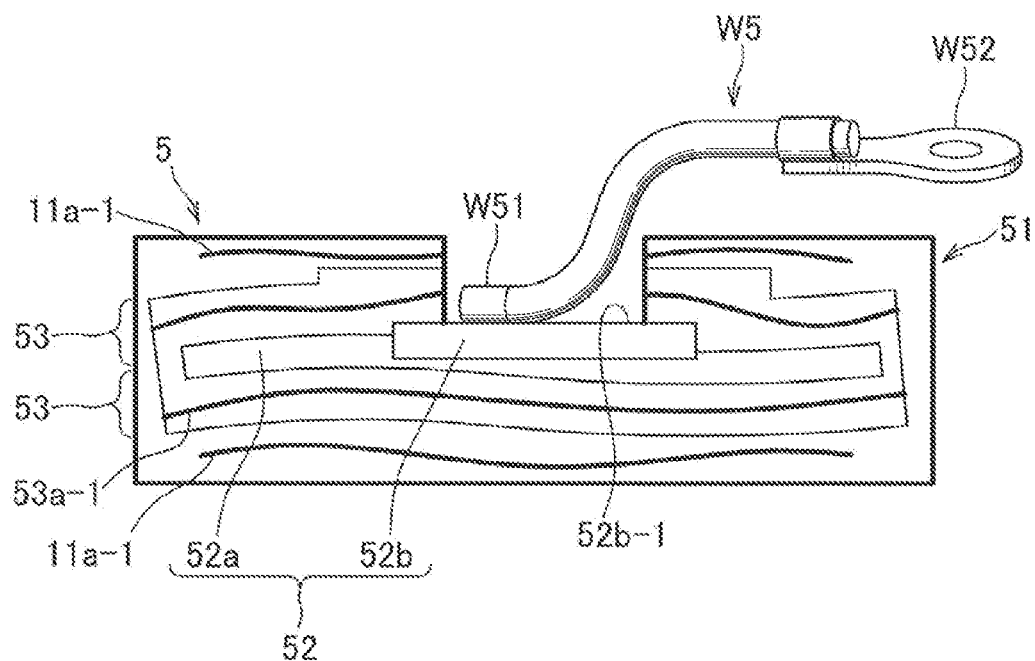
FIG. 13 is a schematic cross-sectional view showing a second connection example with respect to a connecting portion of a conductor of the fifth embodiment.

FIG. 13 is a schematic cross-sectional view illustrating a second connection example with respect to the connecting portion of the conductor of the fifth embodiment.

In the second connection example, an exposed core wire W51 on one end side of an electric wire with terminal W5 as another component is soldered and fixed to the connecting portion 52b-1 of the second conductor 52b that together with the first conductor 52a constitutes the conductor 52 of the composite material structure 5. A round terminal W52 for connection with an electric/electronic device is crimped to the other end side of the electric wire with terminal W5.

As a modified example of the second connection example, instead of the electric wire with terminal W5, one end of a connector terminal of a connector may be soldered and fixed, for example. In another example, as the connecting method for connection with respect to the connecting portion 52b-1, ultrasonic welding, crimping or the like can be used in place of soldering.

In the composite material structure 5 of the fifth embodiment described above also, a decrease in the strength can be prevented while interposing the insulating resin portions 53 between the conductive reinforced resin and the conductor 52, as in the first embodiment and such described above.

Further, in this embodiment, the inner circumferential surface of the recess 51a of the conductive resin portion 51 can support the peripheral portion of the connecting portion 52b-1 while preventing the contact between the connecting portion 52b-1 exposed at the bottom of the recess 51b and the conductive fibers 11a by the insulating resin portion 53. With this support of the peripheral portion, it is possible to improve the mechanical strength of the connecting portion 52b-1 against an external force. It is further possible to reduce the thickness of the connecting portion 52b-1 of the conductor 52 in view of the improvement in the mechanical strength thereof, and it is further possible to use a conductive material that is excellent in electrical property but somewhat inferior in mechanical strength as a material for forming the connecting portion 52b-1 of the conductor 52.

Next, a composite material structure according to a sixth embodiment will be described with reference to FIG. 14 and FIG. 15.

Figure 14:
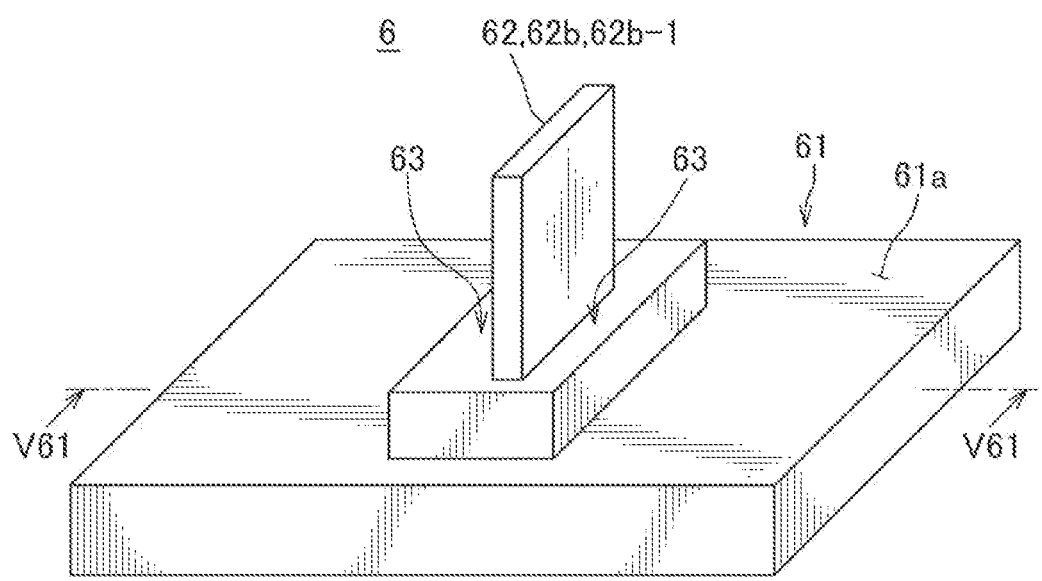
FIG. 14 is a schematic perspective view showing a composite material structure of a sixth embodiment.
Figure 15:
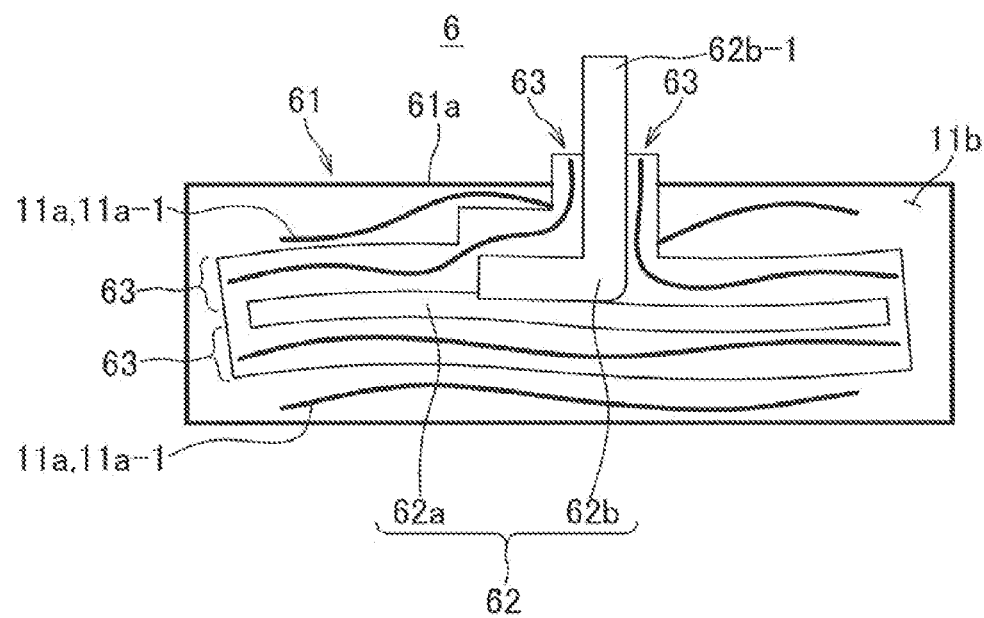
FIG. 15 is a schematic cross-sectional view taken along the line V61-V61 in FIG. 14, showing an internal configuration of the composite material structure shown in FIG. 14.

FIG. 14 is a schematic perspective view showing a composite material structure of the sixth embodiment, FIG. 15 is a schematic cross-sectional view taken along line V61-V61 in FIG. 14, showing an internal configuration of the composite material structure shown in FIG. 14. In FIG. 14 and FIG. 15 also, the components equivalent to those in the first embodiment shown in FIG. 1 and FIG. 2 are also shown with the same reference signs as in FIG. 1 and FIG. 2, and duplicate explanations about these equivalent components are omitted.

In the composite material structure 6 of this embodiment, rectangular parallelepiped-shaped insulating resin portions 63 protrude and are exposed from substantially the center of a wide surface 61a of a conductive resin portion 61 formed in a flat rectangular parallelepiped, so as to sandwich a second conductor 62b of a conductor 62 therebetween. A quadrangular plate-shaped connecting portion 62b-1 of the second conductor 62b protrudes and is exposed from the insulating resin portions 63. Similar to the first embodiment described above, the conductive resin portion 61 is formed of a conductive reinforced resin in which the stack of the conductive fiber sheets 11a-1 formed of the conductive fibers 11a is impregnated with the molten insulating base material 11b.

The conductor 62 of the composite material structure 6 includes a first conductor 62a and a second conductor 62b. The first conductor 62a is entirely embedded in the conductive resin portion 61. The second conductor 62b has a shape in which a quadrangular plate-like metal plate is bent so as to have an L-shaped cross-section, and a part of the second conductor 62b corresponding to a transverse bar of the L-shape is placed near the center of first conductor 62a and joined thereto. A part of the second conductor 62b corresponding to a vertical bar of the L-shape protrudes and is exposed from between the two layers of the insulating resin portions 63 as a quadrangular plate-shaped connecting portion 62b-1. Herein, the shape of the second conductor 62b of the conductor 62 is not limited to the shape including the L-shaped cross section. The shape of the second conductor 62*b* is not limited to a specific shape as long as it is capable of being placed on and joined to the first conductor 62*a* and a part of the second conductor 62*b* can protrude from the insulating resin portions 63, and, for example, it may be a shape including a Z-shaped, T-shaped, or C-shaped cross section.

The insulating resin portions 63 are formed into two layers so as to arrange the connecting portion 62*b*-1 of the second conductor 62*b* protrude as described above and so as to sandwich a rest of the conductor 62 between the layers, and are embedded in the conductive resin portion 61 so as to be interposed between the conductive reinforced resin and the conductor 62.

Next, two connection examples of connecting another component to the connecting portion 62*b*-1 of the conductor 62 of the sixth embodiment described above will be described.

Figure 16:
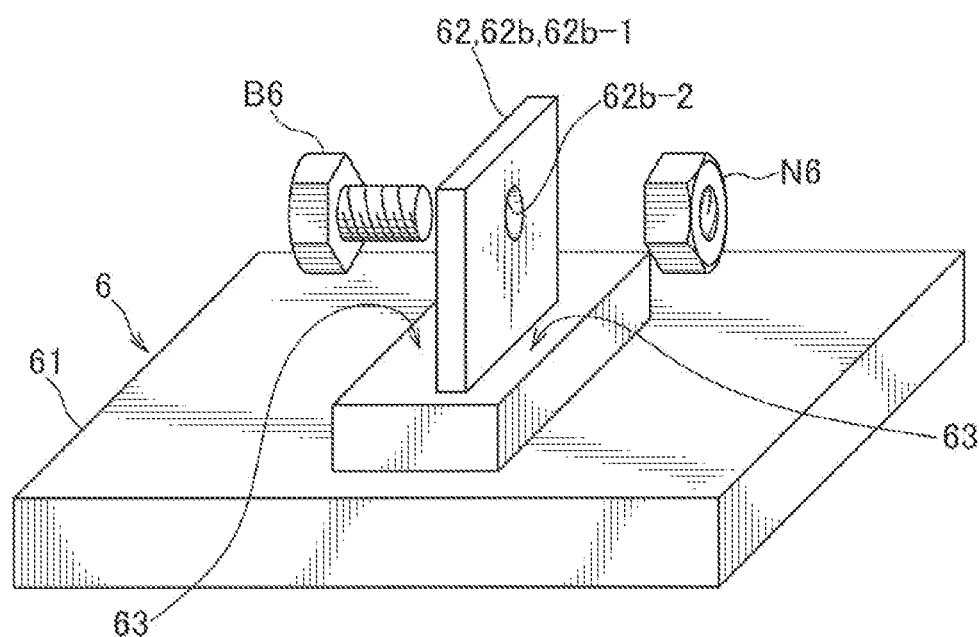
FIG. 16 is a schematic perspective view showing a first connection example with respect to a connecting portion of a conductor of the sixth embodiment.

FIG. 16 is a schematic perspective view illustrating a first connection example with respect to the connecting portion of the conductor of the sixth embodiment.

In the first connection example, a through hole 62*b*-2 for connection is provided through the connecting portion 62*b*-1 of the second conductor 62*b* constituting the conductor 62 of the composite material structure 6. Another component is to be fastened and connected to the connecting portion 62*b*-1 by a bolt B6 inserted through the through hole 62*b*-2 and a nut N6 screwed to the bolt B6. Examples of the another component in this example include a bus bar formed of a metal plate, an electric wire including, at its end, a connecting component such as a round terminal that can be fastened using the bolt B6 and the nut N6, and the like.

As a modified example of the first connection example, a screw hole in which the bolt B6 can be screwed can be provided in place of the through hole 62*b*-2, or a connector terminal including a terminal shape that enables attachment and detachment of the another component to the connecting portion 62*b*-1 can be provided as an electrode.

Figure 17:
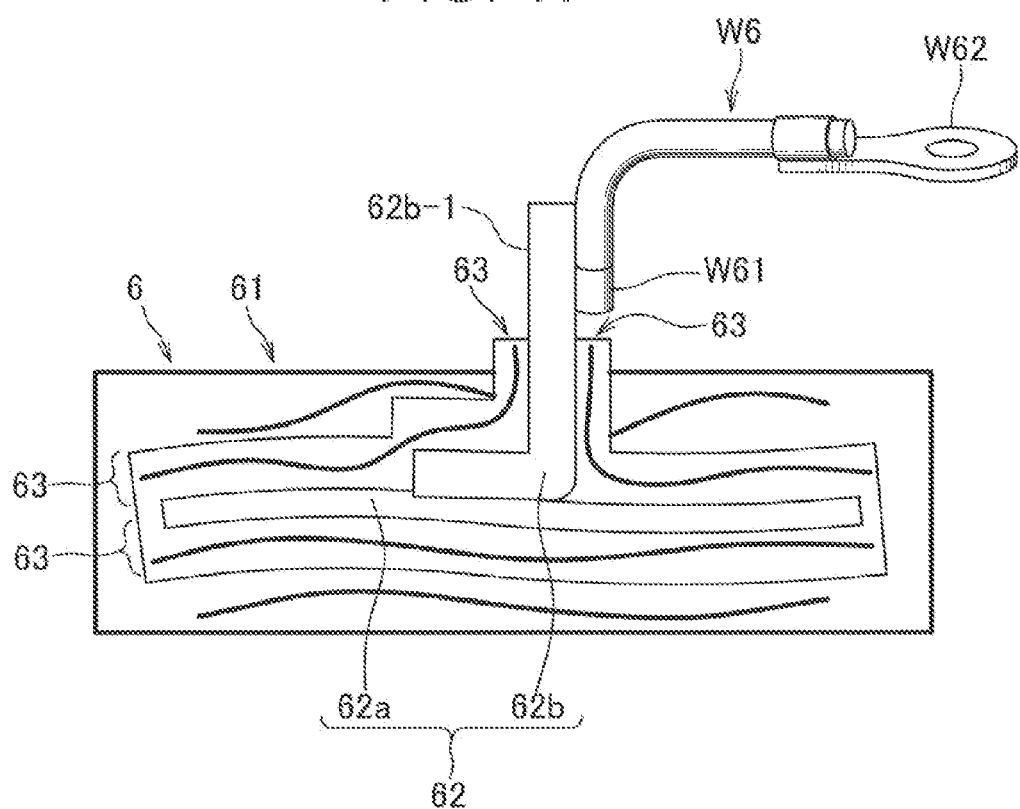
FIG. 17 is a schematic cross-sectional view showing a second connection example with respect to a connecting portion of a conductor of the sixth embodiment.

FIG. 17 is a schematic cross-sectional view illustrating a second connection example with respect to the connecting portion of the conductor of the sixth embodiment.

In the second connection example, an exposed core wire W61 on one end side of an electric wire with terminal W6 as another component is soldered and fixed to the connecting portion 62*b*-1 of the second conductor 62*b* that together with the first conductor 62*a* constitutes the conductor 62 of the composite material structure 6. A round terminal W62 for connection with an electric/electronic device is crimped to the other end side of the electric wire with terminal W6.

As a modified example of the second connection example, instead of the electric wire with terminal W6, one end of a connector terminal of a connector may be soldered and fixed, for example. In another example, as the connecting method for connection with respect to the connecting portion 62*b*-1, ultrasonic welding, crimping or the like can be used in place of soldering.

In the composite material structure 6 of the sixth embodiment described above also, a decrease in the strength can be prevented while interposing the insulating resin portions 63 between the conductive reinforced resin and the conductor 62, as in the first embodiment and such described above.

Further, in this embodiment, the insulating resin portions 63 are partially protruding from the surface of the conductive resin portion 61, and from this protruded part, the connecting portion 62*b*-1 of the conductor 62 is exposed. According to this configuration, the reliability of the prevention of the contact between the connecting portion 62*b*-1 and the conductive reinforced resin can be increased, thereby further preventing the galvanic corrosion.

Further, in this embodiment, the part of the conductor 62 protruding from the exposed portions of the insulating resin portions 63 exposed from the conductive resin portion 61, is the connecting portion 62*b*-1. According to this configuration, since the connecting portion 62*b*-1 protrudes from the insulating resin portions 63, attachment of an electric wire or the like with respect to the connecting portion 62*b*-1, for example, can be performed with good workability.

Next, as one embodiment of a composite material structure producing method, a composite material structure producing method for obtaining the composite material structures 1, . . . , and 6 of the first to sixth embodiments will be described. The composite material structure producing method is basically substantially the same for the first to sixth embodiments, thus the following explanation is given with reference to a composite material structure producing method for obtaining the composite material structure 1 of the first embodiment as a representative example.

Figure 18:
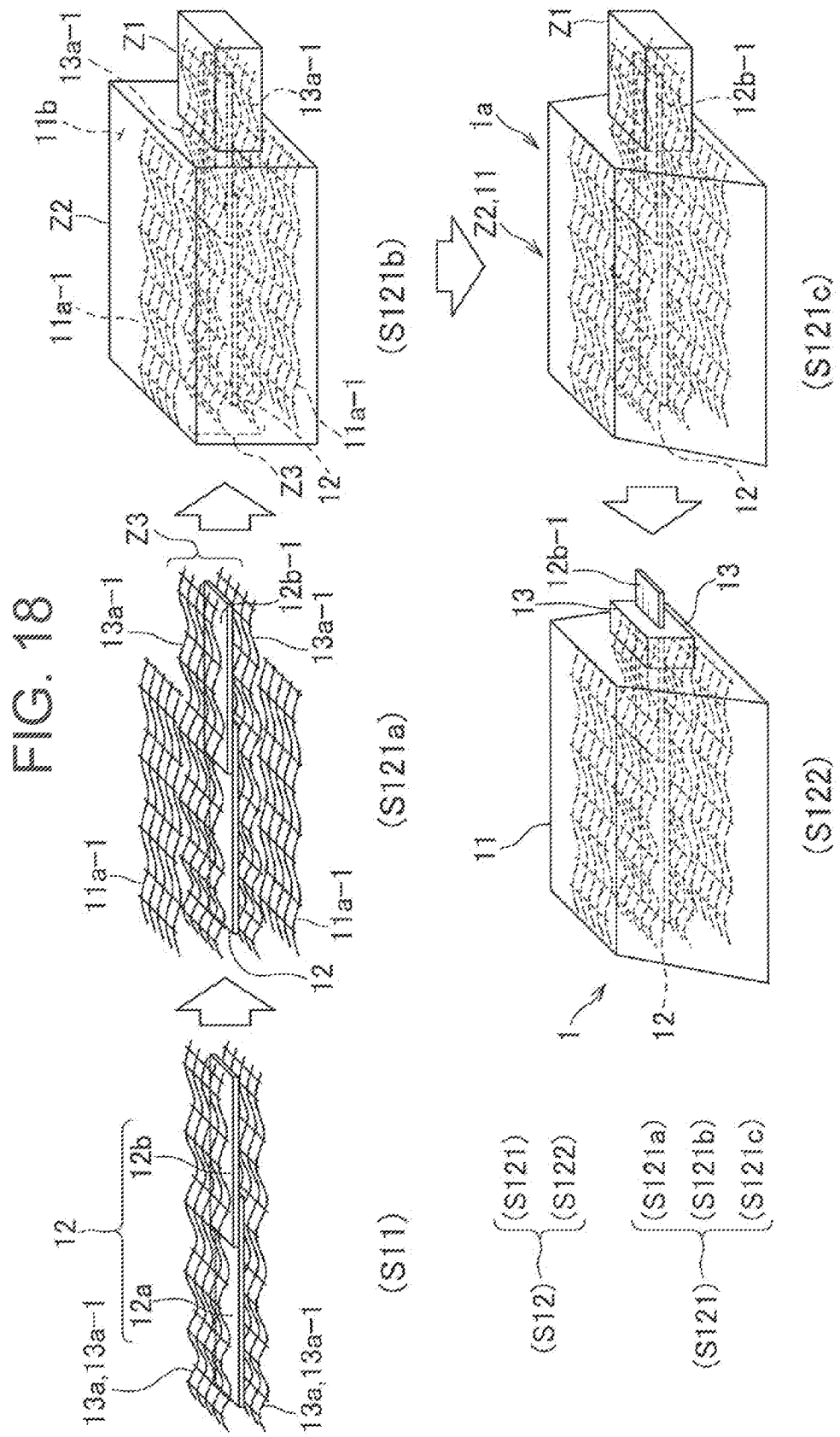
FIG. 18 is a schematic diagram showing a flow of a composite material structure producing method for obtaining the composite material structure of the first embodiment.

FIG. 18 is a schematic diagram illustrating a flow of a composite material structure producing method for obtaining the composite material structure of the first embodiment.

A composite material structure producing method shown in FIG. 18 includes an insulating fiber placing step S11 and a resin portion forming step S12.

The insulating fibers placing step S11 is a step of placing the plurality of insulating fiber sheets 13*a*-1 formed of the insulating fibers 13*a* so as to sandwich therebetween the entire conductor 12 including the second conductor 12*b* joined to the first conductor 12*a*.

A subsequent resin portion forming step S12 is a step of forming, using the conductor 12 that is entirely sandwiched between the insulating fiber sheets 13*a*-1, the conductive resin portion 11 and the insulating resin portions 13 so as to expose the connecting portion 12*b*-1. This resin portion forming step S12 includes a pre-exposure step S121 and an exposure step S122.

The pre-exposure step S121 is a step of forming a pre-exposure structure 1*a* obtained at a step S121*c*, in which the conductor 12, including the connecting portion 12*b*-1, is entirely in a non-exposed state. In the pre-exposure structure 1*a*, a part of the conductor 12 including the connecting portion 12*b*-1 is covered with only insulating resin Z1 that is a forming material of the insulating resin portion 13, and a rest of the conductor 12 is covered with the insulating resin Z1 and conductive reinforced resin Z2 that is a forming material of the conductive resin portion 11. The pre-exposure step S121 further includes a conductive fiber sheet placing step S121*a*, a base material impregnation step S121*b*, and the processing/polishing/cleaning step S121*c*.

The conductive fiber sheet placing step S121*a* is a step of arranging the plurality of conductive fiber sheets 11*a*-1 in a stack so as to sandwich therebetween a stack Z3 constituted of the conductor 12 sandwiched between the plurality of insulating fiber sheets 13*a*-1. At this time, the conductive fiber sheets 11*a*-1 are arranged in the stack so as to be laminated to avoid the connecting portion 12*b*-1. The subsequent base material impregnation step S121*b* is a step of impregnating, with the molten insulating base material 11*b*, the conductive fiber sheet 11*a*-1 sandwiching the stack Z3 and the insulating fiber sheet 13*a*-1 of the stack Z3. After the subsequent curing, the conductor 12 is entirely covered with the insulating resin Z1, and the entire insulating resin Z1 is further covered with the conductive reinforced resin Z2. The subsequent processing/polishing/cleaning step S121*c* is a step of processing/polishing the cured conductive reinforced resin Z2 formed in the base material impregnation step S121b into the conductive resin portion 11 including a desired shape and then cleaning off the polished powder. After this processing/polishing/cleaning step S121c, the pre-exposure structure 1a is completed.

The exposure step S122 following the pre-exposure step S121 is a step of exposing the connecting portion 12b-1 by removing, from the pre-exposure structure 1a, the insulating material Z1 covering the connecting portion 12b-1 of the conductor 12. After the exposure step S122, the insulating resin portions 13 are completed, and the composite material structure 1 is obtained.

According to the composite material structure producing method described above, the composite material structure 1 in which a decrease in the strength can be prevented while interposing the insulating resin portions 13 between the conductive reinforced resin and the conductor 12 can be obtained, as described above.

Further, the composite material producing method of this embodiment is preferable since the composite material structure 1 can be obtained by a series of steps including arranging the conductive fiber sheet 11a-1, the insulating fiber sheet 13a-1 and the conductor 12 in the stack and impregnating the stack with the insulating base material 11b, which can provide a good workability.

Further, in this embodiment, the connecting portion 12b-1 of the conductor 12 is protected since it is embedded in pre-exposure structure 1a formed in the pre-exposure step S121 until the connecting portion 12b-1 is exposed in the exposure step S122. This protection can also prevent the galvanic corrosion during the production, e.g., during the cleaning and such performed appropriately during the production of the composite material structure 1.

In this embodiment, the insulating fiber sheets 13a-1 and the conductive fiber sheets 11a-1 are arranged in stacks in the insulating fiber placing step S11 and in the conductive fiber sheet placing step S121a. Then, in the subsequent base material impregnation step S121b, the stacks of the sheets are impregnated with the insulating base material 11b. However, instead of the insulating fiber sheet 13a-1 and the conductive fiber sheet 11a-1, sheet-shaped prepregs formed by preliminarily incorporating fibers in a resin may be arranged in a stack and formed into one part using heat bonding and the like to obtain the composite material structure. According to this method, the base material impregnation step S121b can be replaced with a step that performs the heat bonding and the like of the stacked prepregs which saves time and effort, and thus this method is preferable.

Next, a modified example of the composite material structure producing method shown in FIG. 18 is explained.

Figure 19:
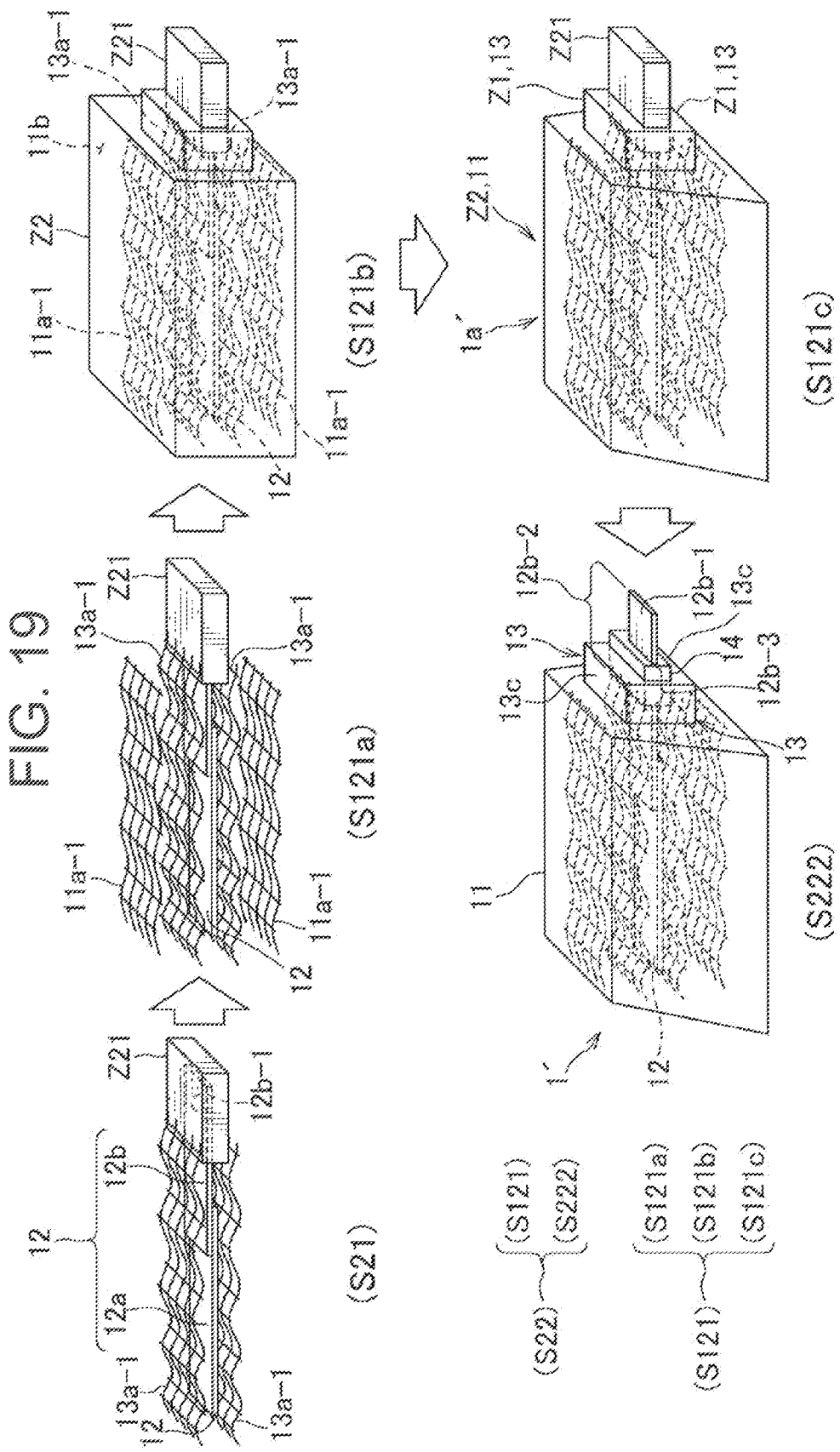
FIG. 19 is a schematic diagram showing a flow of a modified example of the composite material structure producing method shown in FIG. 18.

FIG. 19 is a schematic diagram illustrating a flow of a modified example of the composite material structure producing method shown in FIG. 18. In FIG. 19, the components equivalent to those shown in FIG. 18 are shown with the same reference signs as those in FIG. 18, and in the following, duplicate explanations about these equivalent components are omitted.

In the composite material structure producing method of this modified example, the insulating fiber placing step S21 and the exposure step S222 in the resin portion forming step S22 are different from the composite material structure producing method shown in FIG. 18.

Firstly, in the composite material structure producing method of this modified example, a composite material structure 1' according to a modified example as described below is produced. That is, the composite material structure 1' of the modified example further includes an insulator 14 formed by an insulating material so as to cover the non-exposed portion 12b-3 of the conductor extended portion 12b-2 of the conductor 12 that is extending to the outside of the conductive resin portion 11. In the composite material structure 1' of the modified example, two layers of the insulating resin portions 13 are formed such that the insulating extended portions 13c of the respective layers that are extending from the conductive resin portion 11 sandwich the part of the non-exposed portion 12b-3 via a part of the insulator 14 covering the non-exposed portion 12b-3. The connecting portion 12b-1 protrudes and is exposed from one end surface of the insulator 14.

The insulating material forming the insulator 14 may be any material that can secure the insulating property, and examples thereof include resin, rubber, elastomer, ceramics and the like. In the case where the insulator 14 is formed of resin, rubber or elastomer, examples of the forming method can include injection molding, extrusion molding, blow molding, vacuum molding, pressure molding, compression molding, casting molding, foam molding, hot melt molding, potting and the like. In the case where the insulator 14 is formed of ceramics, examples of the forming method can include machining and the like. By press fitting the conductor 12 in the insulator 14 formed in a manner as described above, the insulator 14 is attached to the conductor 12. In addition, when forming the insulator 14 with resin, rubber, or elastomer, the surface of the surface of the conductor 12 is coated with these materials to perform the formation of the insulator 14 and the attachment to the conductor 12 at the same time. Although the shape of the insulator 14 is described herein as a rectangular parallelepiped shape as shown in FIG. 19, the shape of the insulator 14 is not limited to this, and may be another shape.

In the insulating fiber placing step S21 of the composite material structure producing method of the modified example shown in FIG. 19, the conductor 12 is prepared in which a part thereof including the connecting portion 12b-1 is covered with the insulating material Z21 that is the forming material of the insulator 14. Then, the insulating fiber sheets 13a-1 are placed so as to sandwich this conductor 12. At this time, the insulating fiber sheets 13a-1 are placed so as to overlap a part of the insulating material Z21.

Then, the conductive fiber sheet placing step S121a, the base material impregnation step S121b and the processing/polishing/cleaning step S121c in the pre-exposure step S121 in the resin portion forming step S22 are performed in a state where a part of the conductor 12 is covered with the insulating material Z21. The operation in each step at this time is the same as the composite material structure producing method shown in FIG. 18. However, in the base material impregnation step S121b, the insulating resin Z1 and the conductive reinforced resin Z2 are formed such that a part of the insulating material Z21 covering the connecting portion 12b-1 protrudes and is exposed. Further, in this modified example, the conductive resin portion 11 and the insulating resin portions 13 are completed in the pre-exposure structure 1a' obtained at the completion of the processing/polishing/cleaning step S121c, but the connecting portion 12b-1 is still covered with the insulating material Z21.

In the last exposure step S222, the insulating material Z21 covering the connecting portion 12b-1 of the conductor 12 is removed from the pre-exposure structure 1a, thereby exposing the connecting portion 12b-1. After the exposure step S222, the composite material structure 1' of the modified example is obtained.

With the composite material structure producing method according to the modified example described above also, the composite material structure 1 in which a decrease in the strength is prevented while interposing the insulating resin portion 13 between the conductive reinforced resin and the conductor 12 can be obtained, as in the composite material structure producing method of the above-described embodiment.

Further, the composite material structure producing method according to this modified example also, the connecting portion 12*b*-1 is protected by the insulating material Z21 until it is exposed in the exposure step S222, thereby also preventing the galvanic corrosion during the cleaning and such performed during the production.

Further, according to the composite material structure 1' obtained by the composite material structure producing method of this modified example, the reliability of the prevention of the contact between the basal side of the connecting portion 12*b*-1 and the conductive fibers 11*a* can be further improved by the insulator 14 covering the non-exposed portion 12*b*-3 of the conductor extended portion 12*b*-2. According to the composite material structure 1' described above, this improvement in the reliability of the prevention of the contact can further prevent galvanic corrosion.

It should be noted that embodiments described above only show representative forms of the composite material structure and the composite material structure producing method, and the composite material structure and the composite material structure producing method are not limited thereto and can be variously modified and implemented.

For example, the above-described embodiments exemplary show the composite material structures 1, 1', . . . , 6 in which various shapes, etc. are illustrated with respect to the general appearance and the internal structure of the composite material structure. However, the composite material structure is not limited thereto, and the appearance and the internal structure thereof may be set arbitrarily according to the usage.

LIST OF REFERENCE SIGNS

1, 1', 2, 3, 4, 5, 6 composite material structure
1*a* pre-exposure structure
11,41,51,61 conductive resin portion
11*a* conductive fiber
11*a*-1 conductive fiber sheet
11*b*, 13*b* insulating base material
12, 22, 32, 42, 52, 62 conductor
12*a*, 52*a*, 62*a* first conductor
12*b*, 32*b*, 42*b*, 52*b*, 62*b* second conductor
12*b*-1, 22*b*-1, 42*b*-1, 52*b*-1, 62*b*-1 connecting portion
12*b*-2 conductor extended portion
12*b*-3 non-exposed portion
12*b*-4, 4*a*, 5*a*, 62*b*-2 through hole
13, 43, 53, 63 insulating resin portion
13*a*, 43*a* insulating fiber
13*a*-1, 43*a*-1, 53*a*-1 insulating fiber sheet
13*c* insulating extended portion
14 insulator
32*c* protrusion
41*a* first plane
41*a*-1 first portion
41*b* second plane
41*b*-1 second portion
41*c* standing plane
51*a*, 61*a* surface
51*b* recess
B1, B4, B5, B6 bolt
N1, N4, N5, N6 nut
W1, W4, W5, W6 electric wire with terminal
W11, W41, W51, W61 exposed core wire
W12, W42, W52, W62 round terminal
WS4, WS5 insulating washer
D51 depth direction
Z1 insulating material
Z2 conductive reinforced resin
Z3 stack
Z21 insulating material
S11 insulating fiber placing step
S12, S22 resin portion forming step
S121 pre-exposure step
S121*a* conductive fiber sheet placing step
S121*b* base material impregnation step
S121*c* processing/polishing/cleaning step
S122, S222 exposure step

What is claimed is:

1. A composite material structure comprising:
   a conductive resin portion formed of an electrically conductive reinforced resin in which conductive fibers are contained in an insulating base material;
   a conductor which is formed of an electrically conductive material and at least a part of which is embedded in the conductive resin portion; and
   a plurality of layers of insulating resin portions which is layers of resin portions each including insulating fibers contained in an insulating base material, the plurality of layers of the insulating resin portions being embedded in the conductive resin portion so as to sandwich therebetween the at least the part of the conductor and so as to be interposed between the conductive fibers and the conductor, and
   wherein at least some of the plurality of layers of insulating resin portions are protruded from the conductive resin portion.

2. The composite material structure according to claim 1, wherein
   the conductive resin portion includes a conductive fiber sheet formed of the conductive fibers that is impregnated with an insulating base material.

3. The composite material structure according to claim 1, wherein
   the insulating resin portions include insulating fiber sheets formed of the insulating fibers that are impregnated with insulating base materials.

4. The composite material structure according to claim 1, wherein
   the conductor includes a conductor extended portion which extends to an outside of the conductive resin portion and at least a part of which is exposed as a connecting portion for electrical connection with another component, and
   the insulating resin portions are arranged so as to be interposed between the conductive fibers and the conductor so as to prevent the connecting portion exposed at the conductor extended portion from contacting the conductive fibers.

5. The composite material structure according to claim 4, wherein
   a part of the conductor extended portion on a distal end side thereof distant from the conductive resin portion is exposed as the connecting portion, and
   each of the plurality of layers of the insulating resin portions includes an insulating extended portion extending, together with the conductor extended portion, from the conductive resin portion, such that the plurality of layers of the insulating resin portions sandwiches therebetween at least a part of a non-exposed portion of the conductor extended portion, the non-exposed portion being on a basal side of the conductor extended portion and excluding the connecting portion.

6. The composite material structure according to claim 5, further comprising an insulator formed of an insulating material so as to cover the non-exposed portion of the conductor extended portion, wherein
the plurality of layers of the insulating resin portions is formed such that the insulating extended portions of the respective layers of the insulating resin portions sandwich a part of the non-exposed portion via a part of the insulator covering the non-exposed portion.

7. The composite material structure according to claim 1, wherein
the conductive resin portion includes a step-shaped portion including a first plane and a second plane arranged one step lower from the first plane,
the conductor is embedded in the conductive resin portion such that, at a second portion of the conductive resin portion including the second plane, a part of the conductor is exposed as a connecting portion for electrical connection with another component and a rest of the conductor is embedded in the second portion, and
the insulating resin portions are embedded in the conductive resin portion such that, at a first portion of the conductive resin portion including the first plane, the insulating resin portions are interposed between the conductive fibers and the conductor so as to sandwich the conductor between the insulating resin portions, and, at the second portion of the conductive resin portion, the insulating resin portions are interposed between the conductor and the conductive fibers on a side opposite to an exposed side of the conductor.

8. The composite material structure according to claim 1, wherein
the conductive resin portion includes a cylindrical recess formed on a surface of the conductive resin portion,
the conductor is embedded in the conductive resin portion such that a part of the conductor is exposed as a connecting portion for electrical connection with another component so as to form a bottom of the recess, and
the insulating resin portions are embedded in the conductive resin portion such that, at a part of the conductive resin portion excluding the recess, the insulating resin portions are interposed between the conductive fibers and the conductor so as to sandwich the conductor between the insulating resin portions, and, at a part of the conductive resin portion including the recess, the insulating resin portions are interposed between the conductor and the conductive fibers on a side opposite to an exposed side of the conductor.

9. The composite material structure according to claim 1, wherein
the conductor includes a first conductor and a second conductor, the first conductor being entirely embedded in the conductive resin portion, the second conductor being joined to the first conductor inside the conductive resin portion, and at least a part of the second conductor being embedded in the conductive resin portion, and
the insulating resin portions are embedded in the conductive resin portion so as to be interposed between the conductive fibers and the conductor so as to sandwich therebetween the first conductor and at least an embedded part of the second conductor embedded in the conductive resin portion.

10. The composite material structure according to claim 1, wherein the at least some of the plurality of layers of insulating resin portions protruded from the conductive resin portion are protruded from the conductive resin portion at a face of the conductive resin portion from which the conductor is also protruded from the conductive resin portion.

11. A composite material structure comprising:
a conductive resin portion formed of an electrically conductive reinforced resin in which conductive fibers are contained in an insulating base material;
a conductor which is formed of an electrically conductive material and at least a part of which is embedded in the conductive resin portion; and
a plurality of layers of insulating resin portions which is layers of resin portions each including insulating fibers contained in an insulating base material, the plurality of layers of the insulating resin portions being embedded in the conductive resin portion so as to sandwich therebetween the at least the part of the conductor and so as to be interposed between the conductive fibers and the conductor, wherein
the conductive resin portion includes a step-shaped portion including a first plane and a second plane arranged one step lower from the first plane,
the conductor is embedded in the conductive resin portion such that, at a second portion of the conductive resin portion including the second plane, a part of the conductor is exposed as a connecting portion for electrical connection with another component and a rest of the conductor is embedded in the second portion, and
the insulating resin portions are embedded in the conductive resin portion such that, at a first portion of the conductive resin portion including the first plane, the insulating resin portions are interposed between the conductive fibers and the conductor so as to sandwich the conductor between the insulating resin portions, and, at the second portion of the conductive resin portion, the insulating resin portions are interposed between the conductor and the conductive fibers on a side opposite to an exposed side of the conductor.

12. A composite material structure comprising:
a conductive resin portion formed of an electrically conductive reinforced resin in which conductive fibers are contained in an insulating base material;
a conductor which is formed of an electrically conductive material and at least a part of which is embedded in the conductive resin portion; and
a plurality of layers of insulating resin portions which is layers of resin portions each including insulating fibers contained in an insulating base material, the plurality of layers of the insulating resin portions being embedded in the conductive resin portion so as to sandwich therebetween the at least the part of the conductor and so as to be interposed between the conductive fibers and the conductor, wherein
the conductive resin portion includes a cylindrical recess formed on a surface of the conductive resin portion,
the conductor is embedded in the conductive resin portion such that a part of the conductor is exposed as a connecting portion for electrical connection with another component so as to form a bottom of the recess, and the insulating resin portions are embedded in the conductive resin portion such that, at a part of the conductive resin portion excluding the recess, the insulating resin portions are interposed between the conductive fibers and the conductor so as to sandwich the conductor between the insulating resin portions, and, at a part of the conductive resin portion including the recess, the insulating resin portions are interposed between the conductor and the conductive fibers on a side opposite to an exposed side of the conductor.

* * * * *